US012555528B2

(12) United States Patent
Park

(10) Patent No.: US 12,555,528 B2
(45) Date of Patent: Feb. 17, 2026

(54) DISPLAY DEVICE

(71) Applicant: Samsung Display Co., Ltd., Yongin-si (KR)

(72) Inventor: Junhyun Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/503,216

(22) Filed: Nov. 7, 2023

(65) Prior Publication Data

US 2024/0321202 A1 Sep. 26, 2024

(30) Foreign Application Priority Data

Mar. 24, 2023 (KR) ........................ 10-2023-0039085
Mar. 29, 2023 (KR) ........................ 10-2023-0041538

(51) Int. Cl.
*G09G 3/32* (2016.01)
*G09G 3/3233* (2016.01)

(52) U.S. Cl.
CPC ... *G09G 3/3233* (2013.01); *G09G 2300/0426* (2013.01); *G09G 2300/0852* (2013.01); *G09G 2300/0861* (2013.01)

(58) Field of Classification Search
CPC ......... G09G 3/3233; G09G 2300/0426; G09G 2300/0852; G09G 2300/0861
See application file for complete search history.

(56) References Cited

U.S. PATENT DOCUMENTS 7,414,599 B2 8/2008 Chung et al.
10,355,062 B2 7/2019 Yu
11,367,381 B2 6/2022 Cho et al.
11,651,736 B2 5/2023 Lin et al.
2014/0313242 A1* 10/2014 Kaplan ................ G09G 3/3208 345/694
2017/0132980 A1 5/2017 Wu et al.
2017/0221419 A1* 8/2017 Xiang .................. G09G 3/3233
2018/0102092 A1* 4/2018 Kubota ................ G09G 3/3233
2018/0137818 A1* 5/2018 Kim ..................... G09G 3/2003
2018/0158415 A1* 6/2018 Chaji ................... G09G 3/3258
2021/0020681 A1* 1/2021 Kwag ............... H01L 27/14643
2021/0043145 A1 2/2021 Li
2021/0358394 A1* 11/2021 Yamashita ........... G09G 3/3291
2022/0319415 A1 10/2022 Wang et al.
(Continued)

FOREIGN PATENT DOCUMENTS

JP 2017-90624 5/2017
KR 10-0560780 3/2006
(Continued)

OTHER PUBLICATIONS

Korean International Search Report for International Application No. PCT/KR2023/017793, dated Feb. 5, 2024.

*Primary Examiner* — Kenneth Bukowski
(74) *Attorney, Agent, or Firm* — Innovation Counsel LLP

(57) ABSTRACT

A display device including a plurality of pixels that includes a first pixel and a second pixel that are disposed adjacent to each other in a same row. The first pixel and the second pixel share a same emission control transistor. The emission control transistor is electrically connected to a voltage line and to a common node. The common node is electrically connected to first terminals of driving transistors of both the first pixel and the second pixel.

20 Claims, 28 Drawing Sheets

(56) References Cited

U.S. PATENT DOCUMENTS

| | | | | |
|---|---|---|---|---|
| 2022/0392402 | A1* | 12/2022 | Ueda | G09G 3/325 |
| 2023/0010646 | A1 | 1/2023 | Zhang et al. | |

FOREIGN PATENT DOCUMENTS

| | | | | |
|---|---|---|---|---|
| KR | 10-2018-0025482 | | | 3/2018 |
| KR | 10-2018-0055023 | | | 5/2018 |
| KR | 10-2020-0082830 | | | 7/2020 |
| KR | 10-2021-0010018 | | | 1/2021 |
| KR | 20210010018 | A | * | 1/2021 |
| KR | 10-2021-0079586 | | | 6/2021 |
| KR | 20210079586 | A | * | 6/2021 |
| KR | 10-2021-0085514 | | | 7/2021 |
| KR | 10-2281222 | | | 7/2021 |

* cited by examiner

DISPLAY DEVICE

CROSS-REFERENCE TO RELATED APPLICATIONS

This application claims priority under 35 U.S.C. § 119 from Korean Patent Application No. 10-2023-0039085 filed on Mar. 24, 2023 and Korean Patent Application No. 10-2023-0041538 filed on Mar. 29, 2023 in the Korean Intellectual Property Office, the entire contents of which are incorporated herein by reference.

BACKGROUND

1. Technical Field

One or more embodiments relate to a pixel and a display device including the same.

2. Description of the Related Art

Recently, purposes of display devices have diversified. Also, as the thickness and weight of such display devices are decreasing, the range of use display devices may be widening.

As display devices are being used in a variety of ways, there may be various methods for designing the shape of display devices, and functions that may be grafted or linked to the display devices are increasing.

SUMMARY

One or more embodiments include a display device in which display quality may be improved.

Additional aspects will be set forth in part in the description which follows and, in part, will be apparent from the description, or may be learned by practice of the presented embodiments of the disclosure.

According to one or more embodiments, a display device may include a plurality of pixels, wherein each of the plurality of pixels may include a driving transistor, a driving control circuit electrically connected to the gate of the driving transistor and to a data line, and a light-emitting diode electrically connected to the second terminal of the driving transistor, wherein the plurality of pixels may include a first pixel and a second pixel disposed adjacent to each other, the first pixel and the second pixel may be disposed in a same row, the first pixel and the second pixel may share a first emission control transistor, the first emission control transistor may be electrically connected between a first voltage line and a common node, and the common node may be electrically connected to the first terminal of the driving transistor of the first pixel and to the first terminal of the driving transistor of the second pixel.

The plurality of pixels may further include a third pixel disposed adjacent to the second pixel, the third pixel may be in a same row as the second pixel, the first terminal of the driving transistor of the third pixel may be electrically connected to the common node so that the third pixel may share the first emission control transistor with the second pixel.

A channel width of the first emission control transistor may be equal to or greater than a channel width of a switching transistor in the driving control circuit.

The plurality of pixels may further include a third pixel disposed adjacent to the second pixel, the third pixel and the second pixel may be disposed in a same row, and the third pixel includes a second emission control transistor electrically connected between the first voltage line and the first terminal of the driving transistor of the third pixel.

A channel width of the first emission control transistor may be equal to or greater than greater than a channel width of the second emission control transistor.

The driving transistor of the first pixel and the driving transistor of the second pixel may be symmetrical with respect to a boundary disposed between the first pixel and the second pixel.

The gate of the driving transistor of each of the pixels may include a first gate and a second gate, the second gate may be electrically connected to the second terminal of the driving transistor, and the driving control circuit of each of the pixels may include a first transistor electrically connected to the data line and to the first gate of the driving transistor, a second transistor electrically connected to the first gate of the driving transistor and to a second voltage line, a first capacitor electrically connected to the first gate of the driving transistor and to second terminal of the driving transistor, and a second capacitor electrically connected to the first voltage line and to a second terminal of the driving transistor.

The driving control circuit may further include a third transistor electrically connected to the second terminal of the driving transistor and to the light-emitting diode.

The driving control circuit may further include a fourth transistor electrically connected to the second terminal of the driving transistor and to a third voltage line.

The driving control circuit may further include a fifth transistor electrically connected to the light-emitting diode and to a fourth voltage line.

According to one or more embodiments, a display device may include a first driving transistor disposed in a first circuit area, the first driving transistor including a gate, a first terminal, and a second terminal, a first light-emitting diode electrically connected to the second terminal of the first driving transistor, the first light-emitting diode emitting light of a first color, a second driving transistor disposed in a second circuit area disposed adjacent to the first circuit area, the second driving transistor including a first terminal and a second terminal, a second light-emitting diode electrically connected to the second terminal of the second driving transistor, the second light-emitting diode emitting light of a second color, and a shared transistor electrically connected to a driving voltage line and to a common node, the common node being electrically connected to the first terminal of the first driving transistor and to the first terminal of the second driving transistor.

The shared transistor may be disposed in a partial area from among the first circuit area and the second circuit area.

The display device may further include a third driving transistor disposed in a third circuit area disposed adjacent to the second circuit area, the third driving transistor may include a first terminal and a second terminal, and a third light-emitting diode may be electrically connected to the second terminal of the third driving transistor, the third light-emitting diode may emit light of a third color, wherein the first terminal of the third driving transistor may be electrically connected to the common node.

The display device may further include a switching transistor disposed in the first circuit area and electrically connected to the first driving transistor, wherein a channel width of the shared transistor may be equal to or greater than a channel width of the switching transistor.

The first driving transistor and the second driving transistor may be symmetrical with respect to a boundary between the first circuit area and the second circuit area.

The display device may further include a third driving transistor disposed in a third circuit area disposed adjacent to the second circuit area, the third driving transistor may include a first terminal and a second terminal, an emission control transistor may be disposed in the third circuit area and may be electrically connected to the first terminal of the third driving transistor and to the driving voltage line, and a third light-emitting diode may be electrically connected to the second terminal of the third driving transistor, the third light-emitting diode may emit light of a third color.

A channel width of the shared transistor may be equal to or greater than a channel width of the emission control transistor.

The second driving transistor and the third driving transistor may be symmetrical with respect to a boundary between the second circuit area and the third circuit area.

The display device may further include a common voltage line disposed between the second circuit area and the third circuit area, wherein each of the first light-emitting diode to the third light-emitting diode may include a pixel electrode and an opposing electrode, and the common voltage line may be electrically connected to the opposing electrode.

The display device may further include a first switching transistor disposed in the first circuit area, the first switching transistor may be electrically connected to a data line and to the gate of the first driving transistor, and a second switching transistor disposed in the first circuit area, the second switching transistor may be electrically connected to the gate of the first driving transistor and to a reference voltage line.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE EMBODIMENTS

Figure 1A:
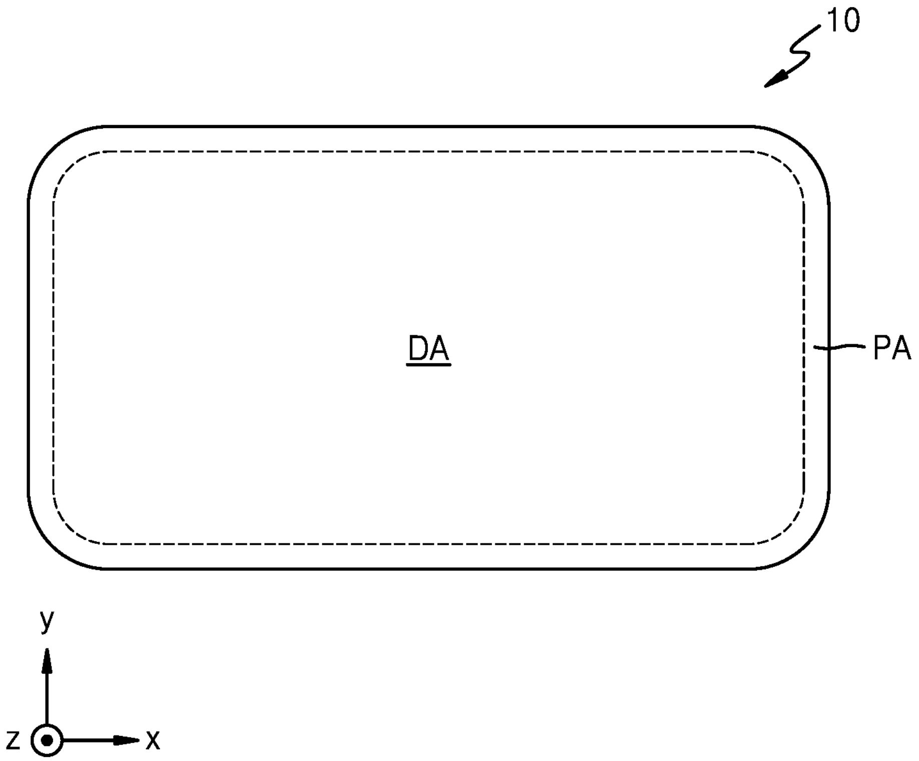
FIGS. 1A and 1B are views schematically showing a display device according to embodiments.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in an embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

Further, in the accompanying drawings, the size and relative sizes of elements may be exaggerated for clarity and/or descriptive purposes. When an embodiment may be implemented differently, a specific process order may be predisposed differently from the described order. For example, two consecutively described processes may be predisposed substantially at a same time or predisposed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on." "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element. Further, the X-axis, the Y-axis, and the Z-axis may not be limited to three axes of a rectangular coordinate system, such as the x, y, and z axes, and may be interpreted in a broader sense. For example, the X-axis, the Y-axis, and the Z-axis may be perpendicular to one another, or may be different directions that may not be perpendicular to one another.

For the purposes of this disclosure, "at least one of A and B" may be construed as A only, B only, or any combination of A and B. Also, "at least one of X, Y, and Z" and "at least one selected from the group consisting of X. Y, and Z" may be construed as X only, Y only, Z only, or any combination of two or more of X, Y, and Z. As used herein, the term "and/or" includes any and all combinations of one or more of the associated listed items. A description that a component is "configured to" perform a specified operation may be defined as a case where the component is constructed and arranged with structural features that can cause the component to perform the specified operation.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below." "under." "lower," "above," "upper." "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including." when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially." "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, may not be necessarily intended to be limiting.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

A display apparatus according to embodiments of the disclosure may be an apparatus for displaying a moving image or a still image, and may be used as a display screen of not only portable electronic devices, such as a mobile phone, a smart phone, a tablet personal computer (PC), a mobile communication terminal, an electronic notebook, an electronic book, a portable multimedia player (PMP), a navigation device, and an ultra mobile PC (UMPC), but also various products, such as a television, a laptop computer, a monitor, a billboard, and Internet of things (IoT). Also, a display device 10 according to an embodiment may be used for a wearable device, such as a smart watch, a watch phone, a glasses-type display, or a head mounted display (HMD). The display device 10 according to an embodiment may be used as a panel of a vehicle, a center information display (CID) disposed on a center fascia or dashboard of a vehicle, a room mirror display replacing a side mirror of a vehicle, or a display disposed on a rear surface of a front seat, as entertainment for a back seat of a vehicle. Also, the display device 10 may be a flexible device.

Figure 1B:
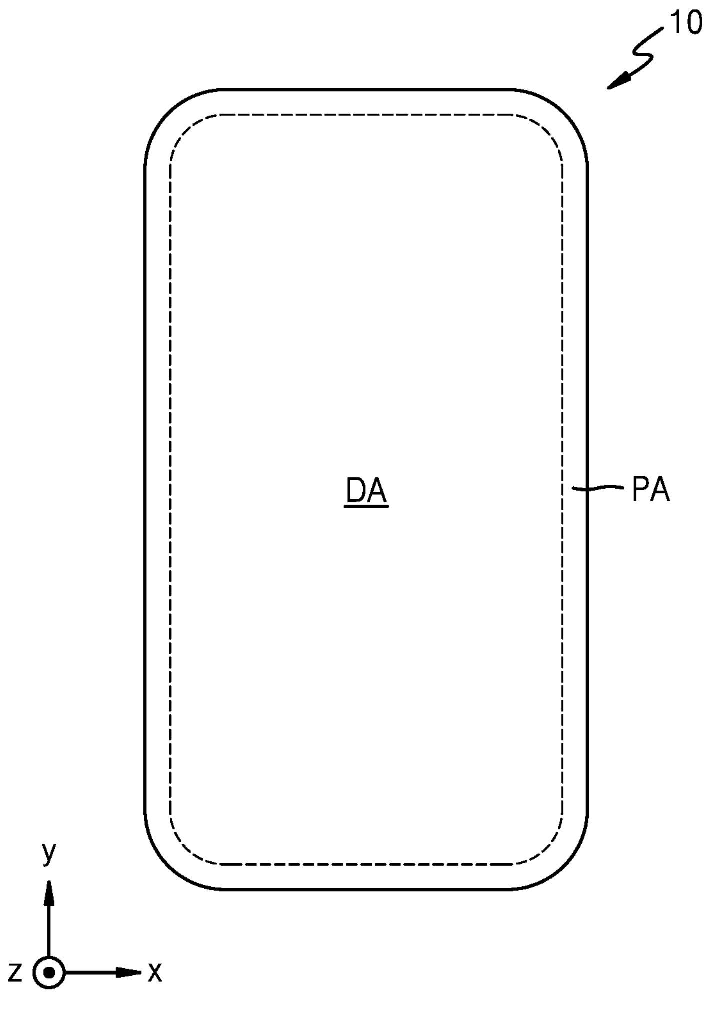
Figure 2:
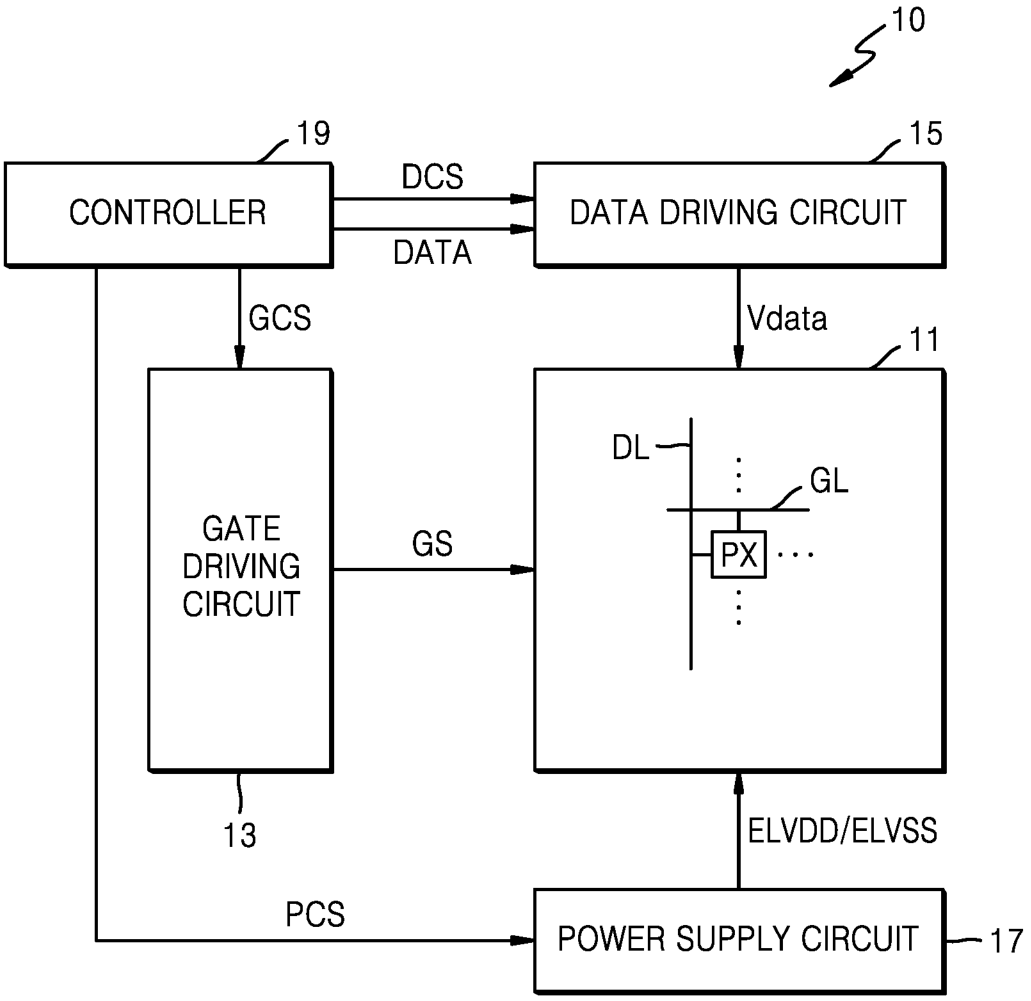
FIG. 2 is a diagram schematically showing a display device according to an embodiment.

FIGS. 1A and 1B are views schematically showing the display device 10 according to embodiments. FIG. 2 is a diagram schematically showing the display device 10 according to an embodiment. Referring to FIGS. 1A and 1B, the display device 10 may include a display area DA where an image may be displayed, and a peripheral area PA outside the display area DA. The display area DA may be entirely surrounded by the peripheral area PA.

In case that the display area DA may be viewed in a plane, the display area DA may have a rectangular shape. According to an embodiment, the display area DA may have a polygonal shape, such as a triangle, a pentagon, or a hexagon, or may have a circular shape, an oval shape, or an atypical shape. The display area DA may have a round shape at a corner of an edge. According to an embodiment, the display device 10 may include the display area DA in which a length in an x direction may be longer than a length in a y direction, as shown in FIG. 1A. According to an embodiment, the display device 10 may include the display area DA in which the length in the y direction may be longer than the length in the x direction, as shown in FIG. 1B.

Referring to FIG. 2, the display device 10 according to an embodiment may include a pixel part 11, a gate driving circuit 13, a data driving circuit 15, a power supply circuit 17, and a controller 19. The pixel part 11 may be disposed in the display area DA. Various conductive lines configured to transmit an electric signal to be applied to the display area DA, external circuits electrically connected to pixel circuits, and pads to which a printed circuit board or a driver integrated circuit (IC) chip may be attached may be located in the peripheral area PA. For example, the gate driving circuit 13, the data driving circuit 15, the power supply circuit 17, and the controller 19 may be disposed in the peripheral area PA.

As shown in FIG. 2, multiple gate lines GL, multiple data lines DL, and multiple pixels PX electrically connected thereto may be disposed in the display area DA. The pixels PX may realize an image by being disposed in various forms, such as a stripe arrangement, a PenTile™ arrangement (diamond arrangement) and a mosaic arrangement. Each pixel PX may include an organic light-emitting diode OLED as a display element (emission device), and the organic light-emitting diode OLED may be electrically connected to the pixel circuit. The pixel circuit may include multiple transistors and at least one capacitor. The pixel PX may be configured to emit, for example, red, green, blue, or white light through the organic light-emitting diode OLED.

Each pixel PX may be electrically connected to at least one corresponding gate line GL from among the gate lines GL, and a corresponding data line DL from among the data lines DL.

The gate lines GL may each extend in the x direction (a row direction) and be electrically connected to the pixels PX located on a same row. The gate lines GL may each be configured to transmit a gate signal to the pixels PX on a same row. The data lines DL may each extend in the y direction (a column direction) and be electrically connected to the pixels PX located on a same column. The data lines DL may each be configured to transmit a data signal to each of the pixels PX on a same column, in synchronization with the gate signal.

According to an embodiment, the peripheral area PA may be a type of non-display area where the pixels PX may not be disposed. According to an embodiment, a portion of the peripheral area PA may be embodied as the display area DA. For example, the pixels PX may be disposed by overlapping the gate driving circuit 13 in at least one corner of the peripheral area PA. Accordingly, a dead area may be reduced and the display area DA may be expanded.

The gate driving circuit 13 may be electrically connected to the gate lines GL, and configured to generate the gate signal in response to a control signal GCS from the controller 19, and sequentially supply the same to the gate lines GL. The gate line GL may be electrically connected to a gate of a transistor included in the pixel PX. The gate signal may be a gate control signal for controlling on and off of the transistor having the gate electrically connected to the gate line GL. The gate signal may be a square wave signal including a gate-on voltage for turning the transistor on, and a gate-off voltage for turning the transistor off.

In FIG. 2, the pixel PX may be electrically connected to one gate line GL, but this may be only an example, and the pixel PX may instead be electrically connected to two or more gate lines GL and the gate driving circuit 13 may be configured to supply, to corresponding gate lines GL, two or more gate signals having different timings of applying an on voltage.

The data driving circuit 15 may be electrically connected to the data lines DL, and configured to supply a data signal to the data lines DL in response to a control signal DCS from the controller 19. The data signal supplied to the data line DL may be supplied to the pixel PX to which the gate signal may be supplied. The data driving circuit 15 may convert input image data DATA having a gray scale input from the controller 19 into a data signal in the form of a voltage or current. FIG. 2 illustrates an example in which the data driving circuit 15 outputs a data signal Vdata in the form of a voltage.

The power supply circuit 17 may be configured to generate voltages required to drive the pixel PX in response to a control signal PCS from the controller 19. The power supply circuit 17 may be configured to generate a first driving voltage ELVDD and a second driving voltage ELVSS, and supply the same to the pixels PX. The first driving voltage ELVDD may be a high-level voltage disposed to a first electrode (a pixel electrode or anode) of a display element included in the pixel PX. The second driving voltage ELVSS may be a low-level voltage disposed to a second electrode (an opposing electrode or cathode) of the display element included in the pixel PX.

The controller 19 may be configured to generate the control signals GCS, DCS, and PCS based on signals input from an external source, and supply the same to the gate driving circuit 13, data driving circuit 15, and power supply circuit 17. The control signal GCS output to the gate driving circuit 13 may include multiple clock signals and a gate initiation signal. The control signal DCS output to the data driving circuit 15 may include a source initiation signal and clock signals.

The display device 10 may include a display panel and the display panel may include a substrate. The pixels PX may be disposed in the display area DA of the substrate. A portion or all of the gate driving circuit 13 may be formed (e.g., directly formed) in the peripheral area PA of the substrate during a process of forming the transistor configuring the pixel circuit in the display area DA of the substrate. The data driving circuit 15, the power supply circuit 17, and the controller 19 may be formed in the form of individual integrated circuit chips or one integrated circuit chip, and disposed on a flexible printed circuit board (FPCB) electrically connected to a pad disposed at one side of the substrate. According to an embodiment, the data driving circuit 15, the power supply circuit 17, and the controller 19 may be disposed (e.g., directly disposed) on the substrate through a chip-on-glass (COG) or chip-on-plastic (COP) method.

Figure 3:
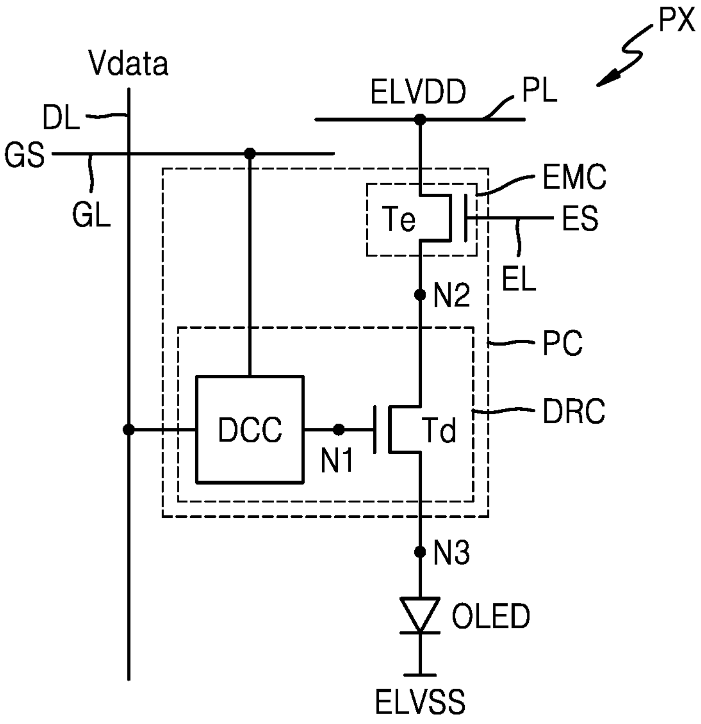
FIG. 3 is a diagram schematically showing a pixel according to an embodiment.

FIG. 3 is a diagram schematically showing the pixel PX according to an embodiment. Referring to FIG. 3, the pixel PX may include a pixel circuit PC electrically connected to the gate line GL and to the data line DL, and the organic light-emitting diode OLED as a display element electrically connected to the pixel circuit PC. According to an embodiment, multiple transistors included in the pixel circuit PC may be an N-type oxide thin-film transistor. An oxide thin-film transistor may be a low-temperature polycrystalline oxide (LTPO) thin-film transistor, in which an active pattern (semiconductor) includes an oxide. However, this may be only an example, and the N-type transistors may not be limited thereto. For example, an active pattern (semiconductor) included in the N-type transistor may include an inorganic semiconductor (for example, amorphous silicon or polysilicon) or an organic semiconductor.

The pixel circuit PC may include a driving circuit DRC and an emission control circuit EMC. The driving circuit DRC may include a driving transistor Td and a driving control circuit DCC electrically connected to the driving transistor Td. The emission control circuit EMC may include an emission control transistor Te electrically connected to the driving transistor Td.

The driving circuit DRC may be configured to be activated by a gate signal GS supplied from the gate line GL to generate and output a driving current corresponding to the data signal Vdata supplied from the data line DL. The driving control circuit DCC may be electrically connected to a first node N1 to connect the data line DL to a gate of the driving transistor Td. The driving control circuit DCC may be configured to control an operation of the driving transistor Td by performing initialization and compensation of the driving transistor Td. The driving control circuit DCC may control gate-source voltage of the driving transistor Td. A voltage output to a second terminal of the driving transistor Td may be controlled according to a voltage supplied to the gate of the driving transistor Td by the driving control circuit DCC. According to an embodiment, the driving control circuit DCC may include a first switching transistor electrically connected to the data line DL and to the gate of the driving transistor Td, and a second switching transistor electrically connected to the gate of the driving transistor Td and to a voltage line supplying a voltage for initializing the gate of the driving transistor Td.

The emission control transistor Te may be electrically connected to a second node N2 connecting a driving voltage line PL and a first terminal of the driving transistor Td, and activated by an emission control signal ES supplied from an emission control line EL.

The driving transistor Td may be configured to generate and output a driving current corresponding to the data signal Vdata in response to operations of the emission control transistor Te and driving control circuit DCC. The second terminal of the driving transistor Td may be electrically connected to the organic light-emitting diode OLED at a third node N3. The organic light-emitting diode OLED may include the pixel electrode (first electrode or anode) and the opposing electrode (second electrode or cathode), and the second driving voltage ELVSS may be applied to the opposing electrode. The organic light-emitting diode OLED may emit light by receiving the driving current from the driving transistor Td, thereby displaying an image.

Figure 4:
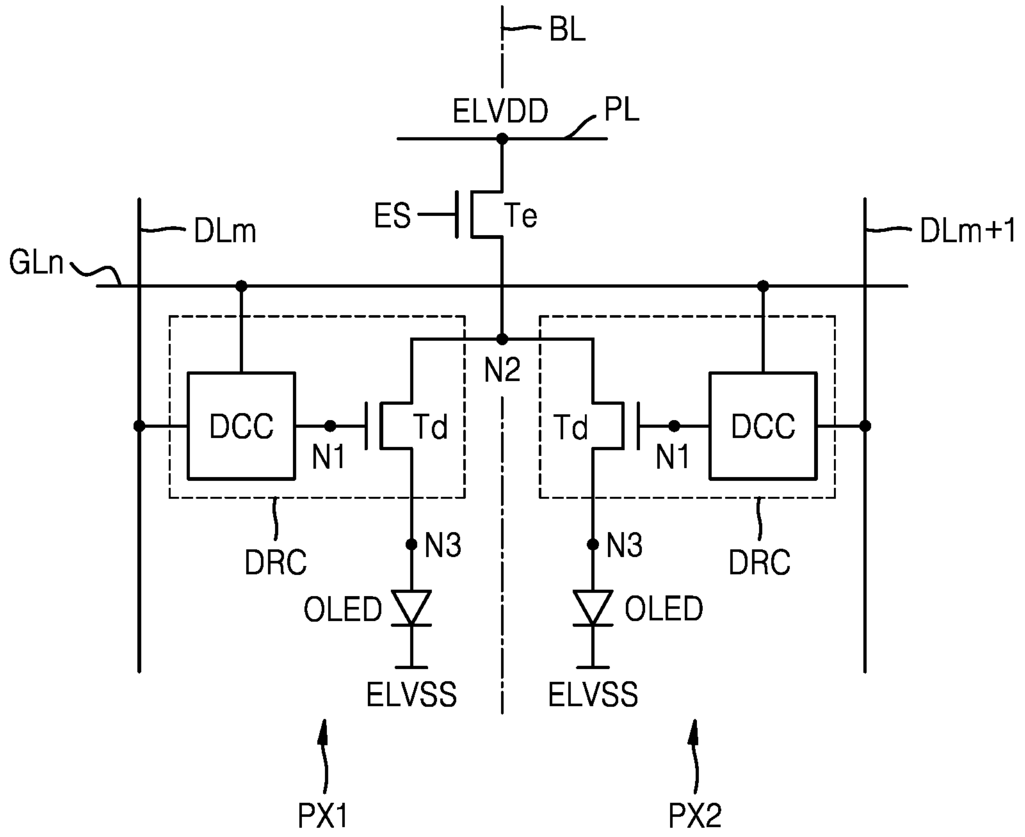
FIGS. 4 and 5 are diagrams schematically showing a connection of pixels according to an embodiment.
Figure 5:
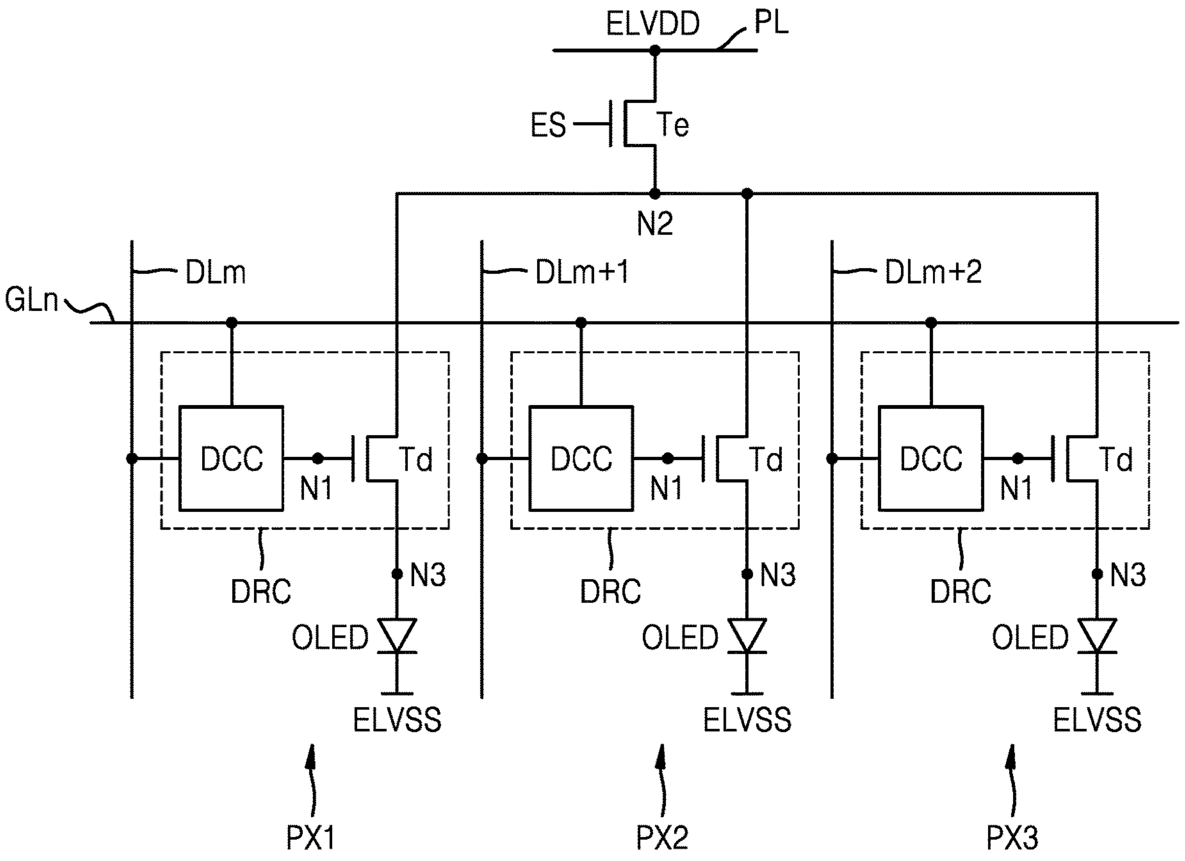

A detailed configuration and structure of a pixel device of the pixel circuit PC will be described below according to various embodiments. FIGS. 4 and 5 are diagrams schematically showing a connection of the pixels PX according to an embodiment. The pixels PX may include pixels configured to emit light of different colors. At least two pixels configured to emit light of different colors may configure a pixel portion (a unit pixel).

The pixels PX may include a first pixel PX1 configured to emit light of a first color, a second pixel PX2 configured to emit light of a second color, and a third pixel PX3 configured to emit light of a third color. For example, the first pixel PX1 may be a red pixel, the second pixel PX2 may be a green pixel, and the third pixel PX3 may be a blue pixel. The first pixel PX1, second pixel PX2, and third pixel PX3 may each include the pixel circuit PC and the organic light-emitting diode OLED electrically connected to the pixel circuit PC.

According to an embodiment, the pixel portion may include the first pixel PX1, the second pixel PX2, and the third pixel PX3. The pixel portion may be repeatedly disposed in the x direction and the y direction according to a certain pattern.

According to an embodiment, at least two adjacent pixels PX disposed on the same row may share a portion of the pixel circuit PC. Two adjacent pixels PX may share the emission control transistor Te. At least two adjacent pixels PX may be pixels configured to emit light of different colors. An interval between the adjacent pixels PX sharing the emission control transistor Te and colors of emitted light of the adjacent pixels PX may vary depending on a configuration of the pixel portion and an arrangement structure of the pixel portion. For example, the adjacent pixels PX may be pixels on immediately neighboring columns, or may be pixels spaced apart from each other by two columns. Hereinafter, the emission control transistor Te may also be referred to as a shared transistor.

Referring to FIG. 4 and according to an embodiment, the first pixel PX1 and the second pixel PX2 electrically connected to an nth gate line GLn on an nth row may share the emission control transistor Te. FIG. 4 illustrates an example in which the first pixel PX1 electrically connected to a data line DLm on an mth column and the second pixel PX2 electrically connected to a data line DLm+1 on an (m+1)th column may be electrically connected to the nth gate line GLn. The first pixel PX1 and the second pixel PX2 may share the emission control transistor Te by using the second node N2 as a common node.

The driving circuit DRC of the first pixel PX1 and the driving circuit DRC of the second pixel PX2 may be symmetrically or asymmetrically disposed about a boundary (or boundary line) BL between the first pixel PX1 and the second pixel PX2. FIG. 4 illustrates an example in which the driving circuit DRC of the first pixel PX1 and the driving circuit DRC of the second pixel PX2 may be symmetrical with respect to the boundary BL between the first pixel PX1 and the second pixel PX2. The boundary BL between the first pixel PX1 and the second pixel PX2 may be the boundary BL between a circuit area where the pixel circuit PC of the first pixel PX1 is disposed and a circuit area where the pixel circuit PC of the second pixel PX2 is disposed. The emission control transistor Te may be disposed in a partial area from among the circuit area of the first pixel PX1 and the circuit area of the second pixel PX2. This partial area may correspond to an arbitrary area in which other circuit devices and/or conductive lines are not disposed among the first circuit area PCA1 and the second circuit area PCA2.

According to an embodiment, the second pixel PX2 and third pixel PX3 which may be electrically connected to the nth gate line GLn, may also share the emission control transistor Te. The first pixel PX1 and third pixel PX3 which may be electrically connected to the nth gate line GLn, may also share the emission control transistor Te.

According to an embodiment of the disclosure, pixels per inch (PPI) of the display area DA may be increased as adjacent pixels PX share a transistor and conductive lines electrically connected to the transistor.

Referring to FIG. 5 and according to an embodiment, the first pixel PX1, the second pixel PX2, and the third pixel PX3 which may be electrically connected to the nth gate line GLn, may share the emission control transistor Te. FIG. 5 illustrates an example in which the first pixel PX1 electrically connected to the data line DLm on the mth column, the second pixel PX2 electrically connected to the data line DLm+1 on the (m+1)th column, and the third pixel PX3 electrically connected to a data line DLm+2 on an (m+2)th column may be electrically connected to the nth gate line GLn. The first pixel PX1, the second pixel PX2, and the third pixel PX3 may share the emission control transistor Te by using the second node N2 as a common node.

The driving circuit DRC of the first pixel PX1 and the driving circuit DRC of the second pixel PX2, and the driving circuit DRC of the second pixel PX2 and the driving circuit DRC of the third pixel PX3 may be symmetrical or asymmetrical based on mutual boundaries. FIG. 5 illustrates an example in which the driving circuit DRC of the first pixel PX1, the driving circuit DRC of the second pixel PX2, and the driving circuit DRC of the third pixel PX3 may be mutually asymmetrical. The emission control transistor Te may be disposed in a partial area from among the circuit area of the first pixel PX1, the circuit area of the second pixel PX2, and the circuit area of the third pixel PX3.

Figure 6:
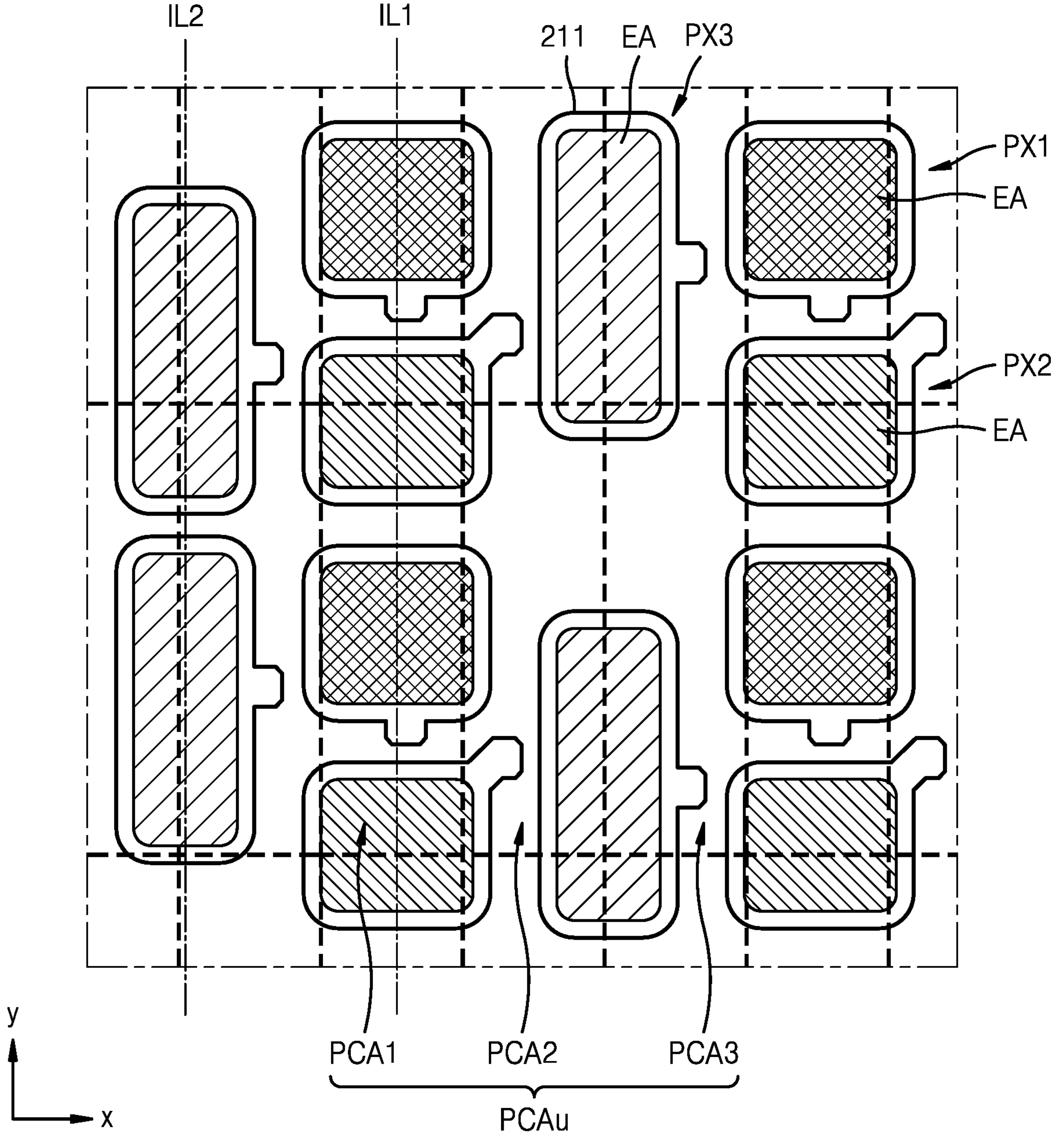
FIG. 6 is a diagram schematically showing an arrangement of emission areas of a plurality of pixels according to an embodiment.

FIG. 6 is a diagram schematically showing an arrangement of emission areas EA of the pixels PX according to an embodiment. Referring to FIG. 6, the display area DA defined in the substrate may include multiple circuit areas that may be areas where rows and columns of pixels cross each other and pixel circuits may be disposed. According to an embodiment, a circuit part (a unit circuit area) including two or more circuit areas adjacent to each other in the x direction may be defined. For example, a circuit part PCAu may include three circuit areas, i.e., a first circuit area PCA1, a second circuit area PCA2, and a third circuit area PCA3 which may be adjacent to each other in the x direction.

The first circuit area PCA1 may be an area where a pixel circuit of the first pixel PX1 may be disposed. The second circuit area PCA2 may be an area where a pixel circuit of the second pixel PX2 may be disposed. The third circuit area PCA3 may be an area where a pixel circuit of the third pixel PX3 may be disposed. The circuit part PCAu may be configured in correspondence to a configuration of a pixel portion.

The organic light-emitting diode OLED may be disposed on an upper layer of the pixel circuit. The organic light-emitting diode OLED may be disposed immediately on an upper portion to overlap an electrically connected pixel circuit or disposed to partially overlap a pixel circuit of another pixel disposed on a row and/or a column offset from and adjacent to the electrically connected pixel circuit.

The first pixel PX1, the second pixel PX2, and the third pixel PX3 may be repeatedly disposed in the x direction and y direction according to a certain pattern. In one column, the first pixel PX1 and the second pixel PX2 may be alternately disposed in the y direction, and the third pixel PX3 may be repeatedly disposed in the y direction on an adjacent column.

FIG. 6 illustrates a pixel electrode 211 and emission area EA of each of the first pixel PX1, the second pixel PX2, and the third pixel PX3. The emission area EA may be an area where an emission layer of the organic light-emitting diode OLED is disposed. The emission area EA may be defined by an opening of a pixel-defining layer. The emission layer may be disposed on the pixel electrode 211, and thus an arrangement of the emission areas EA shown in FIG. 6 may indicate an arrangement of pixel electrodes 211 or an arrangement of pixels. The emission area EA may have a shape of a polygon, such as a quadrangle or an octagon, a circle, or an oval, and may include a shape in which corners (vertexes) of a polygon may be rounded.

As shown in FIG. 6, the emission area EA of the first pixel PX1 and the emission area EA of the second pixel PX2 may be disposed adjacent to each other in the y direction, and the emission area EA of the third pixel PX3 may be disposed adjacent to the emission area EA of the first pixel PX1 and the emission area EA of the second pixel PX2 in the x direction. Accordingly, the emission area EA of the first pixel PX1 and the emission area EA of the second pixel PX2 may be alternately disposed in the y direction according to a virtual straight line IL1, and the emission area EA of the third pixel PX3 may be repeatedly disposed in the y direction according to a virtual straight line IL2.

The emission area EA of the first pixel PX1, the emission area EA of the second pixel PX2, and the emission area EA of the third pixel PX3 may have same or different lengths in the x direction and y direction. For example, the emission area EA of the first pixel PX1 and the emission area EA of the second pixel PX2 may be square, and the emission area EA of the third pixel PX3 may be a rectangle having long sides in the y direction. A length of the emission area EA of the third pixel PX3 in the y direction may be equal to or greater than a sum of a length of the emission area EA of the first pixel PX1 in the y direction and a length of the emission area EA of the second pixel PX2 in the y direction.

The emission area EA of the first pixel PX1, the emission area EA of the second pixel PX2, and the emission area EA of the third pixel PX3 may have same or different areas (sizes). According to an embodiment, the emission area EA of the third pixel PX3 may have a greater area than the emission area EA of the first pixel PX1. The emission area EA of the third pixel PX3 may have a greater area than the emission area EA of the second pixel PX2. The emission area EA of the first pixel PX1 may have a same area as the emission area EA of the second pixel PX2.

The organic light-emitting diodes OLED of the first pixel PX1 and second pixel PX2 (i.e., the emission area EA of the first pixel PX1 and the emission area EA of the second pixel PX2) may overlap the first circuit area PCA1. The emission area EA of the first pixel PX1 may be disposed immediately on the first circuit area PCA1. The emission area EA of the second pixel PX2 may be disposed to partially overlap the first circuit area PCA1 on a same row and the first circuit area PCA1 on an adjacent row. The organic light-emitting diode OLED of the third pixel PX3 (i.e., the emission area EA of the third pixel PX3) may be disposed to partially overlap the second circuit area PCA2 and the third circuit area PCA3. The emission area EA of the third pixel PX3 may be disposed to partially overlap the second circuit area PCA2 and third circuit area PCA3 on a same row, and the second circuit area PCA2 and third circuit area PCA3 on an adjacent row.

Figure 7:
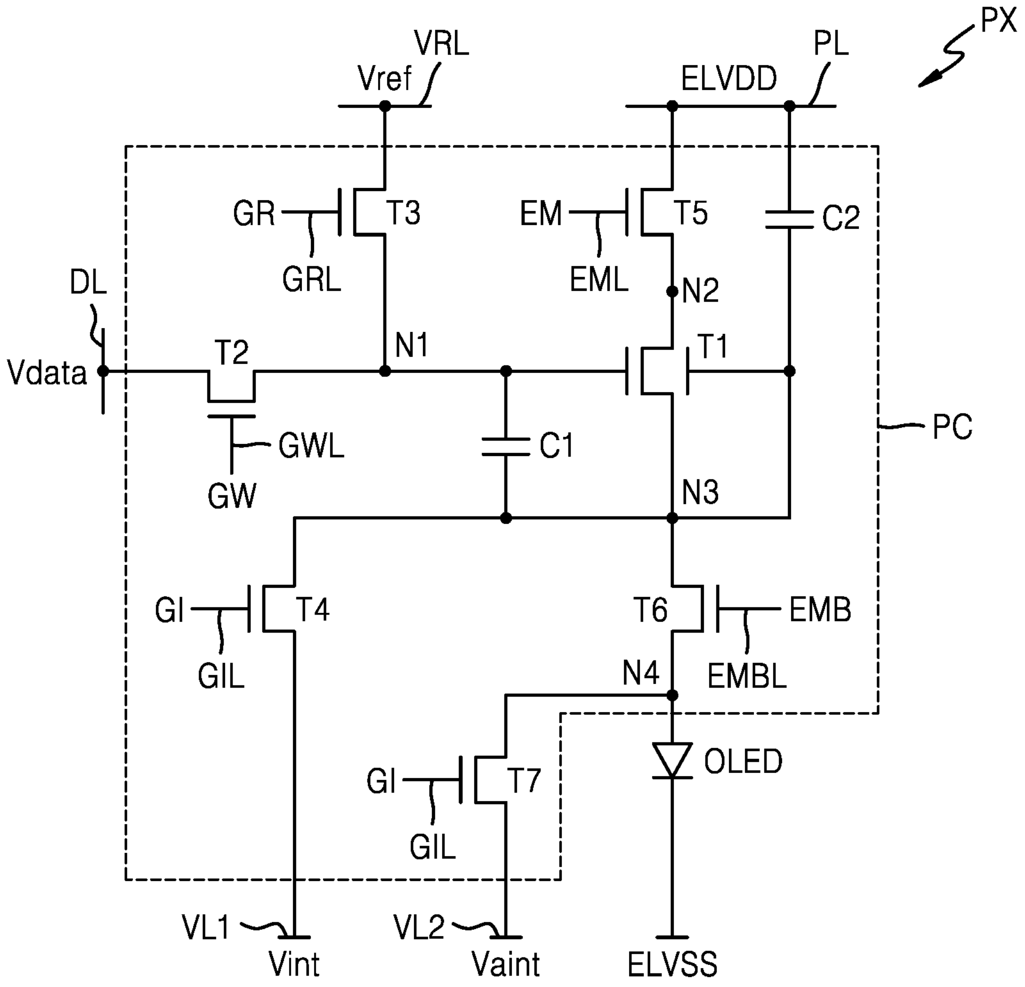
FIG. 7 is schematic diagram of an equivalent circuit of a pixel according to an embodiment.
Figure 8:
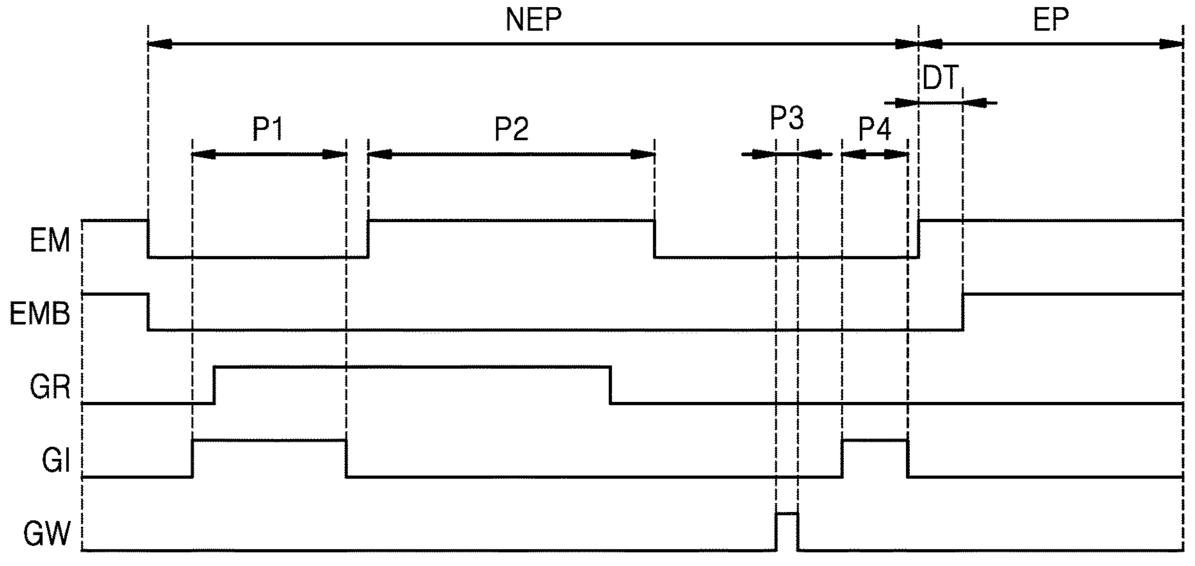
FIG. 8 is a diagram schematically showing signals for describing the operation of the pixel of FIG. 7.

FIG. 7 is schematic diagram of an equivalent circuit of the pixel PX according to an embodiment. FIG. 8 is a diagram schematically showing signals for describing an operation of the pixel PX of FIG. 7. Referring to FIG. 7, the pixel PX may include the organic light-emitting diode OLED as a display element, and the pixel circuit PC electrically connected to the organic light-emitting diode OLED.

The pixel PX may be electrically connected to a first gate line GWL configured to transmit a first gate signal GW, a second gate line GIL configured to transmit a second gate signal GI, a third gate line GRL configured to transmit a third gate signal GR, a fourth gate line EML configured to transmit a fourth gate signal EM, a fifth gate line EMBL configured to transmit a fifth gate signal EMB, and the data line DL configured to transmit the data signal Vdata. Light emission of the pixel PX may be controlled by the fourth gate signal EM and the fifth gate signal EMB, and thus the fourth gate signal EM and the fifth gate signal EMB may be referred to as emission control signals, and the fourth gate line EML and the fifth gate line EMBL may be referred to as emission control lines.

Also, the pixel PX may be electrically connected to a driving voltage line PL configured to transmit the first driving voltage ELVDD, a reference voltage line VRL configured to transmit a reference voltage Vref, a first initialization voltage line VL1 configured to transmit a first initialization voltage Vint, and a second initialization voltage line VL2 configured to transmit a second initialization voltage Vaint.

The first to fifth gate lines GWL, GIL, GRL, EML, and EMBL may be disposed in the pixel part 11 shown in FIG. 2, and the gate driving circuit 13 may be configured to apply the first gate signal GW, the second gate signal GI, the third gate signal GR, the fourth gate signal EM, and the fifth gate signal EMB respectively to the first gate line GWL, the second gate line GIL, the third gate line GRL, the fourth gate line EML, and the fifth gate line EMBL. The power supply circuit 17 may generate the reference voltage Vref, the first initialization voltage Vint, and the second initialization voltage Vaint, and supply the same to the pixels PX.

A voltage level of the first driving voltage ELVDD may be greater than a voltage level of the second driving voltage ELVSS. A voltage level of the reference voltage Vref may be lower than the voltage level of the first driving voltage ELVDD. A voltage level of the first initialization voltage Vint may be lower than the voltage level of the second driving voltage ELVSS. A voltage level of the second initialization voltage Vaint may be higher than the voltage level of the first initialization voltage Vint. The voltage level of the second initialization voltage Vaint may be equal to or higher than the voltage level of the second driving voltage ELVSS.

The pixel circuit PC may include first to seventh transistors T1 to T7, and first and second capacitors C1 and C2. The first transistor T1 may be a driving transistor configured to output driving current corresponding to the data signal Vdata, and the second to seventh transistors T2 to T7 may be switching transistors configured to transmit signals. A first terminal (first electrode) and a second terminal (second electrode) of each of the first to seventh transistors T1 to T7 may be a source or a drain according to voltages of the first terminal and the second terminal. For example, according to the voltages of the first terminal and the second terminal, the first terminal may be a drain and the second terminal may be a source, or the first terminal may be a source and the second terminal may be a drain.

The first transistor T1 may be the driving transistor Td shown in FIG. 3. The fifth transistor T5 may be the emission control transistor Te shown in FIG. 3. The second transistor T2, the third transistor T3, the fourth transistor T4, the sixth transistor T6, the seventh transistor T7, the first capacitor C1, and the second capacitor C2 may configure the driving control circuit DCC shown in FIG. 3.

A node to which a first gate of the first transistor T1 may be electrically connected may be defined as the first node N1, a node to which a first terminal of the first transistor T1 may be electrically connected may be defined as the second node N2, and a node to which a second terminal of the first transistor T1 may be electrically connected may be defined as the third node N3.

The first transistor T1 may be electrically connected between the driving voltage line PL and the organic light-emitting diode OLED. The first transistor T1 may be electrically connected between the second node N2 and the third node N3. The first transistor T1 may include a gate, the first terminal electrically connected to the second node N2, and the second terminal electrically connected to the third node N3. The gate of the first transistor T1 may include the first gate electrically connected to the first node N1 and a second gate electrically connected to the third node N3. The first gate and the second gate may be disposed on different layers while facing each other. For example, the first gate and second gate of the first transistor T1 may face each other with a semiconductor therebetween.

The first gate of the first transistor T1 may be electrically connected to a second terminal of the second transistor T2, a first terminal of the third transistor T3, and the first capacitor C1. The second gate of the first transistor T1 may be electrically connected to a first terminal of the sixth transistor T6, the first capacitor C1, and the second capacitor C2. The first terminal of the first transistor T1 may be electrically connected to the driving voltage line PL via the fifth transistor T5, and the second terminal thereof may be electrically connected to the organic light-emitting diode OLED via the sixth transistor T6. The second terminal of the first transistor T1 may be electrically connected to a first terminal of the fourth transistor T4, the first terminal of the sixth transistor T6, the first capacitor C1, and the second capacitor C2. The first transistor T1 may be configured to control a current amount of a driving current flowing through the organic light-emitting diode OLED by receiving the data signal Vdata according to a switching operation of the second transistor T2.

The second transistor T2 (a data write transistor) may be electrically connected to the data line DL and the first gate of the first transistor T1. The second transistor T2 may include a gate electrically connected to the first gate line GWL, a first terminal electrically connected to the data line DL, and the second terminal electrically connected to the first node N1. The second terminal of the second transistor T2 may be electrically connected to the first gate of the first transistor T1, the first terminal of the third transistor T3, and the first capacitor C1. The second transistor T2 may be turned on by the first gate signal GW applied to the first gate line GWL to electrically connect the data line DL and the first node N1 to each other, and may be configured to transmit the data signal Vdata applied to the data line DL to the first node N1.

The third transistor T3 (a first initialization transistor) may be electrically connected to the first gate of the first transistor T1 and the reference voltage line VRL. The third transistor T3 may include a gate electrically connected to the third gate line GRL, the first terminal electrically connected to the first node N1, and a second terminal electrically connected to the reference voltage line VRL. The first terminal of the third transistor T3 may be electrically connected to the first gate of the first transistor T1, the second terminal of the second transistor T2, and the first capacitor C1. The third transistor T3 may be turned on by the third gate signal GR applied to the third gate line GRL to transmit the reference voltage Vref applied to the reference voltage line VRL to the first node N1.

The fourth transistor T4 (a second initialization transistor) may be electrically connected to the first transistor T1 and the first initialization voltage line VL1. The fourth transistor T4 may include a gate electrically connected to the second gate line GIL, the first terminal electrically connected to the third node N3, and a second terminal electrically connected to the first initialization voltage line VL1. The first terminal of the fourth transistor T4 may be electrically connected to the second terminal of the first transistor T1, the first terminal of the sixth transistor T6, the first capacitor C1, and the second capacitor C2. The fourth transistor T4 may be turned on by the second gate signal GI applied to the second gate line GIL to transmit the first initialization voltage Vint applied to the first initialization voltage line VL1 to the third node N3.

The fifth transistor T5 (the first emission control transistor) may be electrically connected to the driving voltage line PL and the first transistor T1. The fifth transistor T5 may include a gate electrically connected to the fourth gate line EML, a first terminal electrically connected to the driving voltage line PL, and a second terminal electrically connected to the first terminal of the first transistor T1. The fifth transistor T5 may be turned on or off according to the fourth gate signal EM applied to the fourth gate line EML.

The sixth transistor T6 (the second emission control transistor) may be electrically connected to the first transistor T1 and the organic light-emitting diode OLED. The sixth transistor T6 may be electrically connected between the third node N3 and a fourth node N4. The sixth transistor T6 may include a gate electrically connected to the fifth gate line EMBL, the first terminal electrically connected to the third node N3, and a second terminal electrically connected to the fourth node N4. The first terminal of the sixth transistor T6 may be electrically connected to the second terminal of the first transistor T1, the first terminal of the fourth transistor T4, the first capacitor C1, and the second capacitor C2. The second terminal of the sixth transistor T6 may be electrically connected to a first terminal of the seventh transistor T7 and a pixel electrode of the organic light-emitting diode OLED. The sixth transistor T6 may be turned on or off according to the fifth gate signal EMB applied to the fifth gate line EMBL.

The seventh transistor T7 (a third initialization transistor) may be electrically connected to the organic light-emitting diode OLED and the second initialization voltage line VL2. The seventh transistor T7 may be electrically connected to the sixth transistor T6 and the second initialization voltage line VL2. The seventh transistor T7 may include a gate electrically connected to the second gate line GIL, the first terminal electrically connected to the fourth node N4, and a second terminal electrically connected to the second initialization voltage line VL2. The first terminal of the seventh transistor T7 may be electrically connected to the second terminal of the sixth transistor T6 and a pixel electrode of the organic light-emitting diode OLED. The seventh transistor T7 may be turned on by the second gate signal GI applied to the second gate line GIL to transmit the second initialization voltage Vaint applied to the second initialization voltage line VL2 to the fourth node N4.

The first capacitor C1 may be electrically connected between the first gate of the first transistor T1 and the second terminal of the first transistor T1. A first electrode of the first capacitor C1 may be electrically connected to the first node N1 and a second electrode thereof may be electrically connected to the third node N3. The first electrode of the first capacitor C1 may be electrically connected to the first gate of the first transistor T1, the second terminal of the second transistor T2, and the first terminal of the third transistor T3. The second electrode of the first capacitor C1 may be electrically connected to the second terminal and second gate of the first transistor T1, the second electrode of the second capacitor C2, the first terminal of the fourth transistor T4, and the first terminal of the sixth transistor T6. The first capacitor C1 may be a storage capacitor that stores a voltage corresponding to the data signal Vdata and a threshold voltage of the first transistor T1.

The second capacitor C2 may be electrically connected between the driving voltage line PL and the third node N3. A first electrode of the second capacitor C2 may be electrically connected to the driving voltage line PL. A second electrode of the second capacitor C2 may be electrically connected to the second terminal and second gate of the first transistor T1, the second electrode of the first capacitor C1, the first terminal of the fourth transistor T4, and the first terminal of the sixth transistor T6. Capacitance of the first capacitor C1 may be greater than capacitance of the second capacitor C2.

The organic light-emitting diode OLED may be electrically connected to the first transistor T1, through the sixth transistor T6. The organic light-emitting diode OLED may include a pixel electrode (anode) electrically connected to the fourth node N4 and an opposing electrode (cathode) facing the pixel electrode, and the opposing electrode may receive the second driving voltage ELVSS. The opposing electrode may be a common electrode for the pixels PX.

Referring to FIG. 8, the pixel PX may operate in a non-emitting period NEP and an emitting period EP for each frame. The non-emitting period NEP may include a first period P1, a second period P2, a third period P3, and a fourth period P4.

Each of the first gate signal GW, the second gate signal GI, the third gate signal GR, the fourth gate signal EM, and the fifth gate signal EMB may have a gate-on voltage for some periods and a gate-off voltage for some periods. According to an embodiment, the gate-on voltage may be a high-level voltage and the gate-off voltage may be a low-level voltage.

The first period P1 may be a first initialization period where the first node N1 electrically connected to the first gate of the first transistor T1 and the fourth node N4 electrically connected to the pixel electrode of the organic light-emitting diode OLED may be initialized. During the first period P1, the second gate signal GI of the gate-on voltage may be supplied (applied) to the second gate line GIL, and the third gate signal GR of the gate-on voltage may be supplied to the third gate line GRL. The first gate signal GW, the fourth gate signal EM, and the fifth gate signal EMB may be supplied as the gate-off voltage. A gate-on voltage applying timing of the third gate signal GR may be delayed by a certain time as compared to a gate-on voltage applying timing of the second gate signal GI.

The fourth transistor T4 and seventh transistor T7 may be turned on by the second gate signal GI, and the third transistor T3 may be turned on by the third gate signal GR. The second terminal of the first transistor T1 may be initialized to the first initialization voltage Vint by the turned-on fourth transistor T4, and the pixel electrode of the organic light-emitting diode OLED may be initialized to the second initialization voltage Vaint by the turned-on seventh transistor T7. The first gate of the first transistor T1 may be initialized to the reference voltage Vref by the turned-on third transistor T3.

The second period P2 may be a compensation period where the threshold voltage of the first transistor T1 may be compensated for. During the second period P2, the third gate signal GR of the gate-on voltage may be supplied to the third gate line GRL, and the fourth gate signal EM of the gate-on voltage may be supplied to the fourth gate line EML. The first gate signal GW, the second gate signal GI, and the fifth gate signal EMB may be supplied as the gate-off voltage.

The third transistor T3 may be turned on by the third gate signal GR, and the fifth transistor T5 may be turned on by the fourth gate signal EM. Accordingly, the first transistor T1 may be turned on as the reference voltage Vref may be supplied to the first node N1 and the first driving voltage ELVDD may be supplied to the first terminal of the first transistor T1. The first transistor T1 may be turned off in case that a voltage of the second terminal of the first transistor T1 reaches to a difference (Vref-Vth) between the reference voltage Vref and a threshold voltage Vth of the first transistor T1. Also, the threshold voltage Vth of the first transistor T1 may be compensated for, as a voltage corresponding to the threshold voltage Vth of the first transistor T1 may be stored in the first capacitor C1.

The third period P3 may be a write period where the data signal Vdata may be supplied to the pixel PX. During the third period P3, the first gate signal GW of the gate-on voltage may be supplied to the first gate line GWL. The second gate signal GI, the third gate signal GR, the fourth gate signal EM, and the fifth gate signal EMB may be supplied as the gate-off voltage.

The second transistor T2 may be turned on by the first gate signal GW. The turned-on second transistor T2 may be configured to transmit the data signal Vdata from the data line DL to the first node N1, i.e., the first gate of the first transistor T1. Accordingly, a voltage of the first node N1 may be changed from the reference voltage Vref to a voltage corresponding to the data signal Vdata. Here, a voltage of the third node N3 may also change in response to a voltage change amount of the first node N1. A voltage of the third node N3 may be a voltage ($Vref-Vth+\alpha\times(Vdata-Vref)$) changed according to a capacity ratio ($\alpha=C1/(C1+C2)$) of the first capacitor C1 and the second capacitor C2. Accordingly, the threshold voltage Vth of the first transistor T1 and the voltage corresponding to the data signal Vdata may be charged in the first capacitor C1.

The fourth period P4 may be a second initialization period where the third node N3 electrically connected to the second terminal of the first transistor T1 and the fourth node N4 electrically connected to the pixel electrode of the organic light-emitting diode OLED may be initialized before the emitting period EP. During the fourth period P4, the second gate signal GI of the gate-on voltage may be supplied to the second gate line GIL. The first gate signal GW, the third gate signal GR, the fourth gate signal EM, and the fifth gate signal EMB may be supplied as the gate-off voltage.

The fourth transistor T4 and the seventh transistor T7 may be turned on by the second gate signal GI, the first initialization voltage Vint may be transmitted to the second terminal of the first transistor T1 by the turned-on fourth transistor T4, and the second initialization voltage Vaint may be transmitted to the pixel electrode of the organic light-emitting diode OLED by the turned-on seventh transistor T7.

During the emitting period EP, the fourth gate signal EM and fifth gate signal EMB may be supplied as the gate-on voltage, and the first gate signal GW, second gate signal GI, and third gate signal GR may be supplied as the gate-off voltage. The second to fourth transistors T2 to T4 may be turned off by the first gate signal GW, second gate signal GI, and third gate signal GR, and the fifth transistor T5 and sixth transistor T6 may be turned on by the fourth gate signal EM and fifth gate signal EMB. The first transistor T1 outputs a driving current $Id \propto (Vgs-Vth)^2$ corresponding to a voltage that was stored in the first capacitor C1, and the organic light-emitting diode OLED may emit light in brightness corresponding to the driving current.

According to an embodiment, a gate-on voltage applying timing of the fifth gate signal EMB may be delayed by a certain time DT as compared to a gate-on voltage applying timing of the fourth gate signal EM. A voltage level of a voltage applied to the first terminal of the sixth transistor T6 may be increased by first applying the gate-on voltage of the fourth gate signal EM, and then the gate-on voltage of the fifth gate signal EMB may be applied so as to reduce a voltage difference between the first terminal and second terminal of the sixth transistor T6, thereby minimizing voltage fluctuation of the fourth node N4 and minimizing a flicker phenomenon.

According to an embodiment, the gate on voltage applying timing of the fifth gate signal EMB and the gate on voltage applying timing of the fourth gate signal EM may instead be the same.

Figure 9:
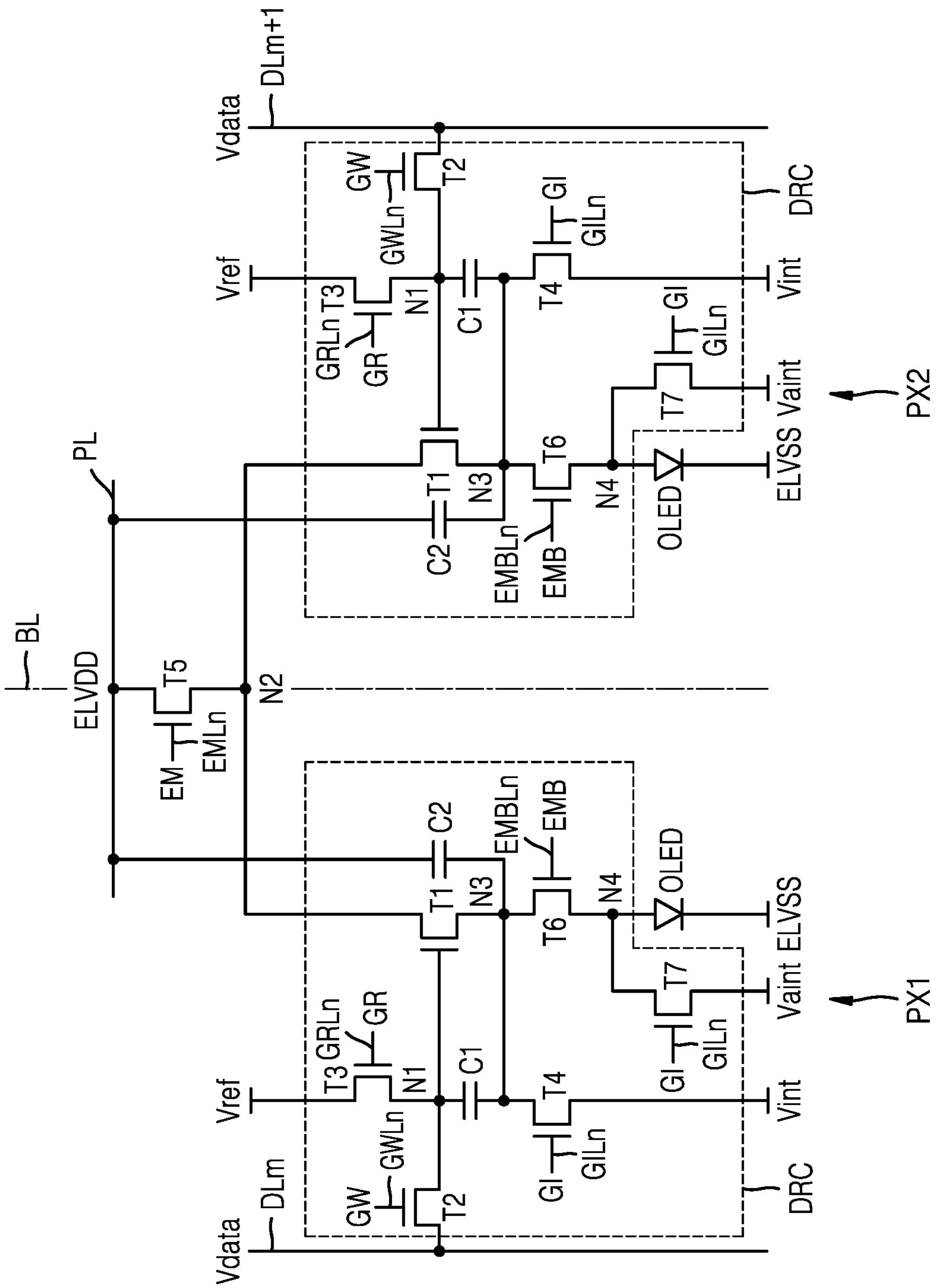
FIGS. 9 to 11 are diagrams schematically showing a connection of pixels according to an embodiment.
Figure 10:
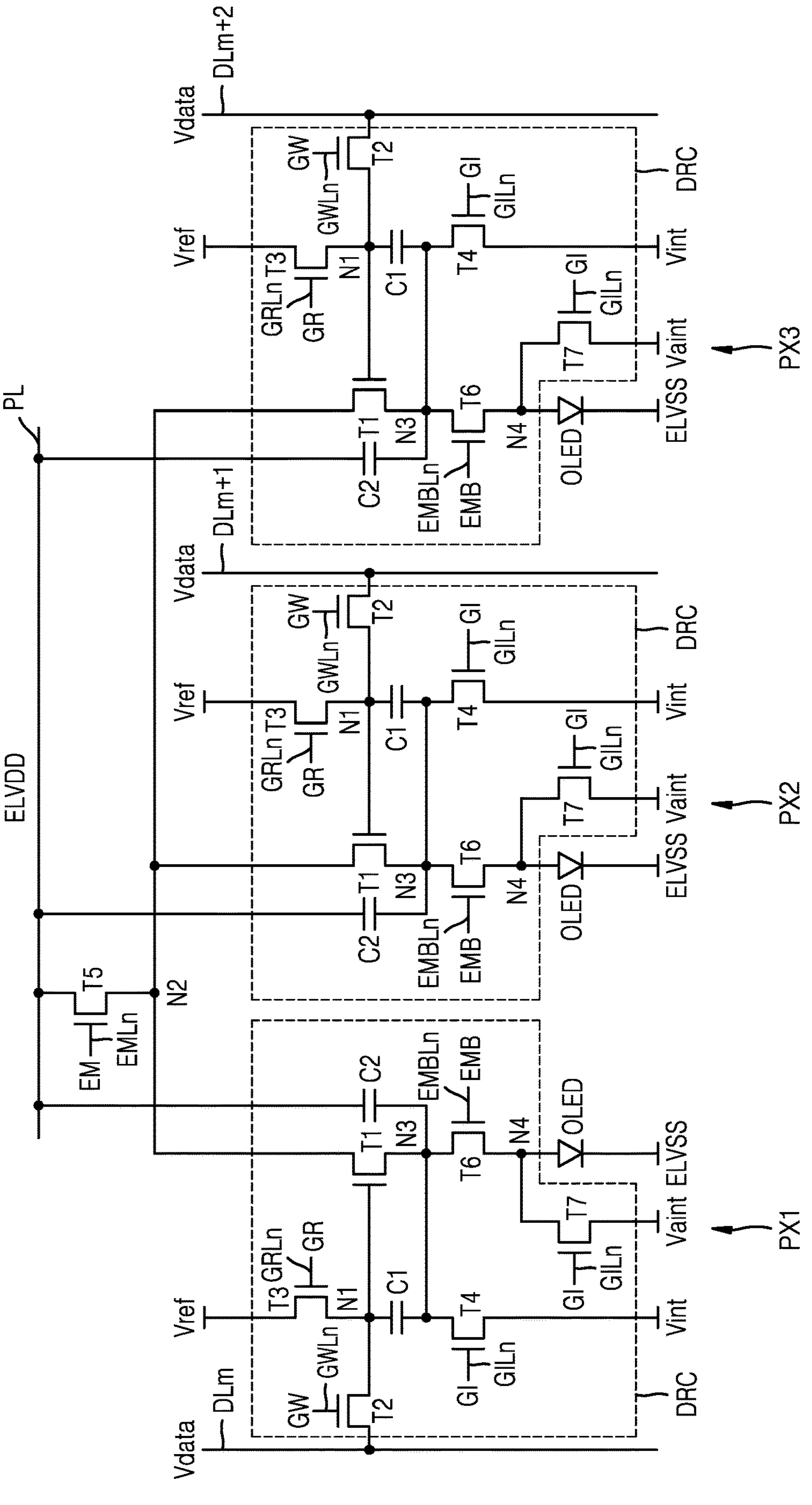
Figure 11:
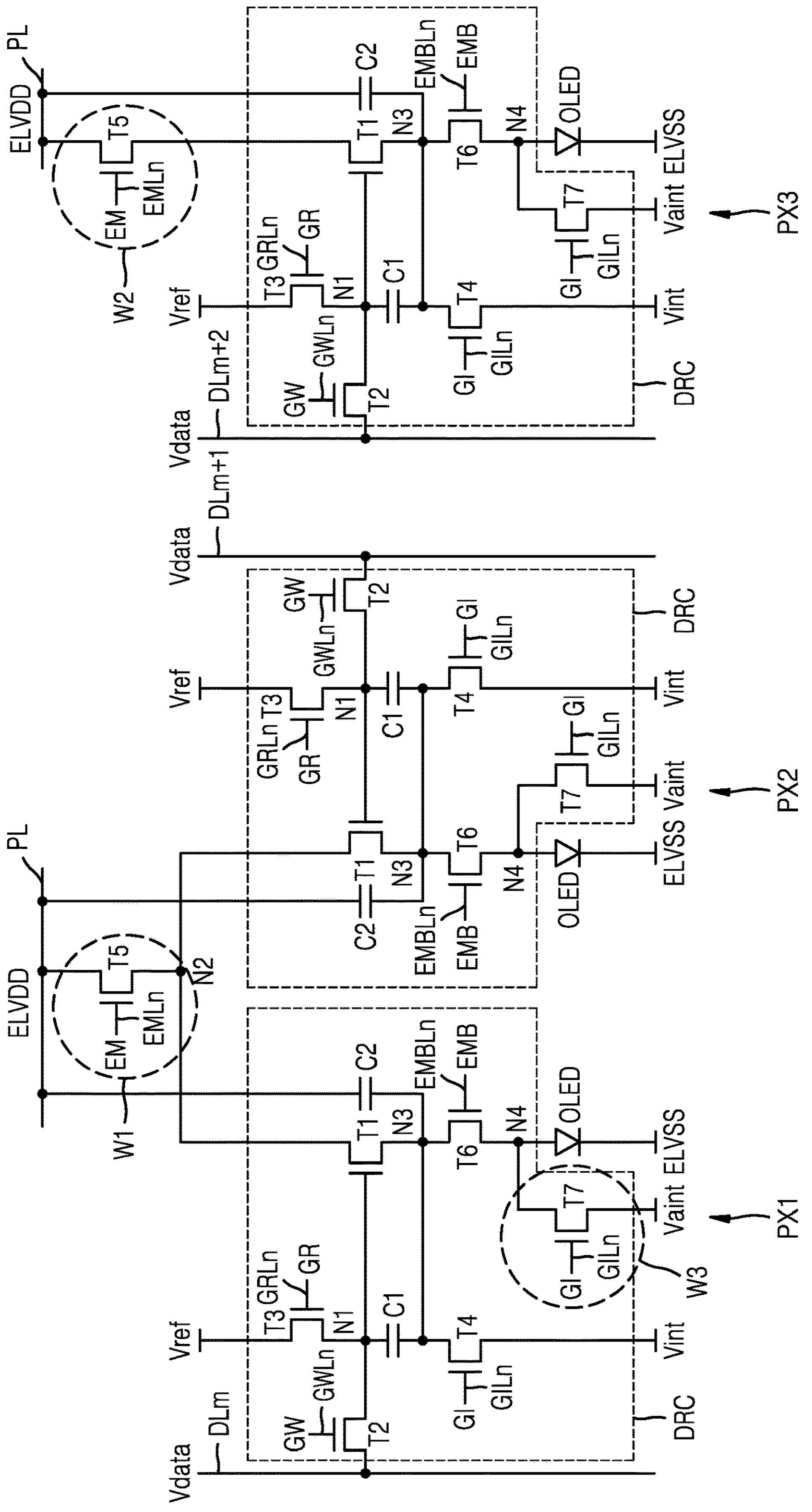
Figure 12A:
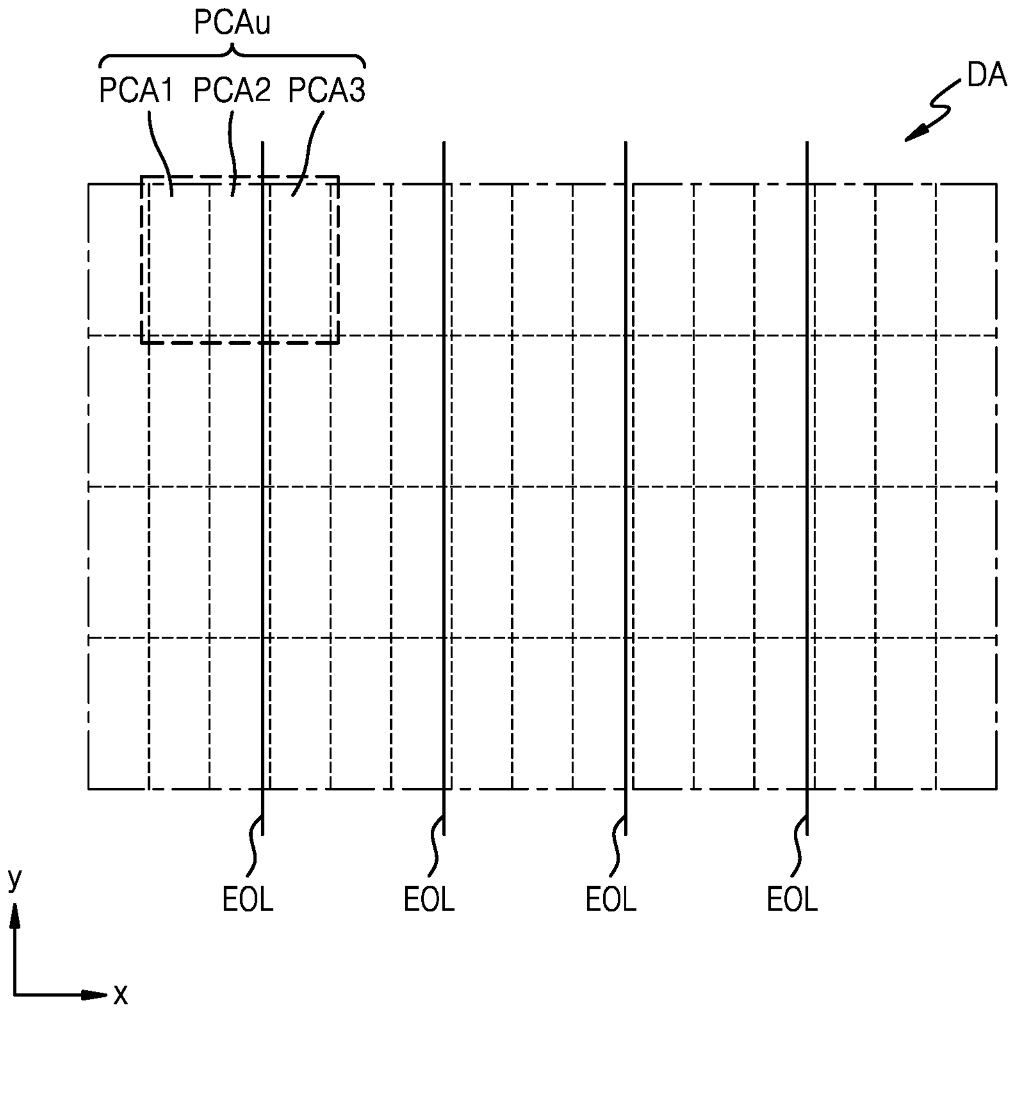
FIGS. 12A and 12B are diagrams schematically showing an arrangement of vertical wires in the embodiment of FIG. 11.
Figure 12B:
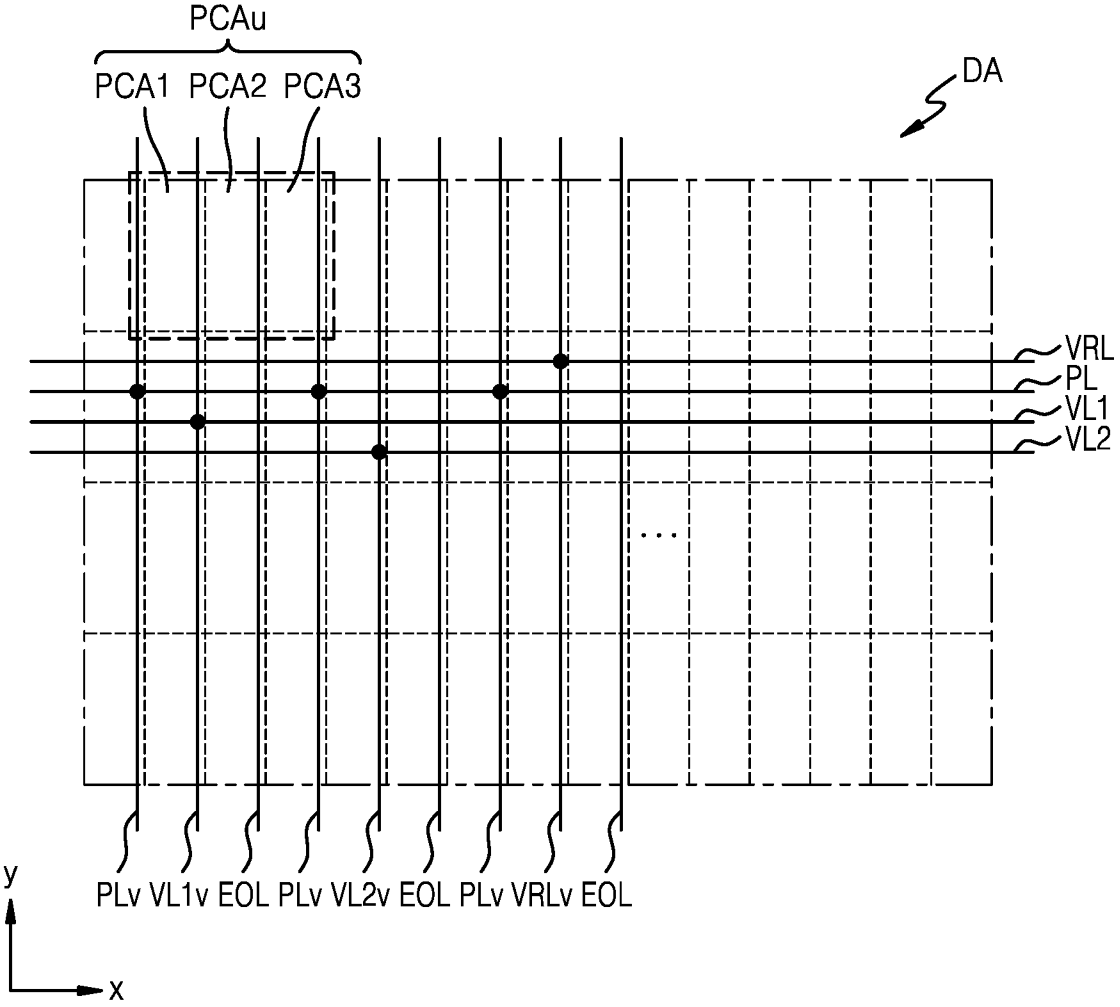

FIGS. 9 to 11 are diagrams schematically showing a connection of the pixels PX according to an embodiment. FIGS. 12A and 12B are diagrams schematically showing an arrangement of vertical conductive lines in the embodiment of FIG. 11. In FIGS. 9 to 11, the first pixel PX1, the second pixel PX2, and the third pixel PX3 may each correspond to the pixel PX shown in FIG. 7, and may be disposed as shown in FIG. 6.

Referring to FIG. 9 and according to an embodiment, the first pixel PX1 and the second pixel PX2 which may be electrically connected to nth first to fifth gate lines GWLn, GILn, GRLn, EMLn, and EMBLn on an nth row, may share the fifth transistor T5. The first pixel PX1 may be electrically connected to the data line DLm on the mth column, and the second pixel PX2 may be electrically connected to the data line DLm+1 on the (m+1)th column. The first pixel PX1 and the second pixel PX2 may share the fifth transistor T5 by using the second node N2 as a common node.

The driving circuit DRC of the first pixel PX1 and the driving circuit DRC of the second pixel PX2 may be symmetrical or asymmetrical with respect to the boundary BL (or boundary line BL) between the first pixel PX1 and the second pixel PX2. FIG. 9 illustrates an example in which the driving circuit DRC of the first pixel PX1 and the driving circuit DRC of the second pixel PX2 may be mutually symmetrical. The fifth transistor T5 may be disposed in a partial area from among the circuit area of the first pixel PX1 and the circuit area of the second pixel PX2. This partial area may correspond to an arbitrary area in which other circuit devices and/or conductive lines are not disposed among the first circuit area PCA1 and the second circuit area PCA2.

Similarly, the third pixel PX3 electrically connected to a data line on an (m+2)th column and the first pixel PX1 electrically connected to a data line on an (m+3)th column which may be electrically connected to the nth first to fifth gate lines GWLn, GILn, GRLn, EMLn, and EMBLn, may share a fifth transistor T5. Next, the second pixel PX2 electrically connected to a data line on an (m+4)th column and the third pixel PX3 electrically connected to a data line on an (m+5)th column which may be electrically connected to the nth first to fifth gate lines GWLn, GILn, GRLn, EMLn, and EMBLn, may share a fifth transistor T5.

Referring to FIG. 10, the first pixel PX1, the second pixel PX2, and the third pixel PX3 which may be electrically connected to the nth first to fifth gate lines GWLn, GILn, GRLn, EMLn, and EMBLn, may share a fifth transistor T5. The first pixel PX1 may be electrically connected to the data line DLm on the mth column, the second pixel PX2 may be electrically connected to the data line DLm+1 on the (m+1)th column, and the third pixel PX3 may be electrically connected to the data line DLm+2 on the (m+2)th column. The first pixel PX1, the second pixel PX2, and the third pixel PX3 may share the fifth transistor T5 by using the second node N2 as a common node.

The driving circuit DRC of the first pixel PX1, the driving circuit DRC of the second pixel PX2, and the driving circuit DRC of the third pixel PX3 may be symmetrical or asymmetrical based on mutual boundaries. The driving circuit DRC of the first pixel PX1 and the driving circuit DRC of the second pixel PX2, and the driving circuit DRC of the second pixel PX2 and the driving circuit DRC of the third pixel PX3 may be symmetrical or asymmetrical based on mutual boundaries. FIG. 10 illustrates an example in which the driving circuit DRC of the first pixel PX1 and the driving circuit DRC of the second pixel PX2 may be mutually bilaterally symmetrical, and the driving circuit DRC of the second pixel PX2 and the driving circuit DRC of the third pixel PX3 may be mutually asymmetrical.

The fifth transistor T5 may be disposed in a partial area from among the circuit area of the first pixel PX1, the circuit area of the second pixel PX2, and the circuit area of the third pixel PX3.

According to an embodiment, two pixels from among the first pixel PX1, the second pixel PX2, and the third pixel PX3 may share the fifth transistor T5, and a remaining pixel may not share a fifth transistor T5. For example, as shown in FIG. 11, the first pixel PX1 and second pixel PX2 which may be electrically connected to the nth row, may share the fifth transistor T5 by using the second node N2 as a common node, and the third pixel PX3 may not share the fifth transistor T5.

According to an embodiment, the second pixel PX2 and third pixel PX3 which may be electrically connected to the nth row, may share a fifth transistor T5 by using the second node N2 as a common node, and the first pixel PX1 may not share the fifth transistor T5. The first pixel PX1 and third pixel PX3 which may be electrically connected to the nth row, may share a fifth transistor T5 by using the second node N2 as a common node, and the second pixel PX2 may not share the fifth transistor T5.

According to an embodiment, pixel circuits of two pixels sharing the fifth transistor T5 may be symmetrical based on a boundary of the two pixels, and a pixel circuit of a remaining pixel may be asymmetrical to the pixel circuits of the two pixels. The driving circuit DRC of the first pixel PX1, the driving circuit DRC of the second pixel PX2, and the driving circuit DRC of the third pixel PX3 may be symmetrical or asymmetrical based on the mutual boundaries. The driving circuit DRC of the first pixel PX1 and the driving circuit DRC of the second pixel PX2, as well as the driving circuit DRC of the second pixel PX2 and the driving circuit DRC of the third pixel PX3 may be symmetrical or asymmetrical based on the mutual boundaries. FIG. 11 illustrates an example in which the driving circuit DRC of the first pixel PX1 and the driving circuit DRC of the second pixel PX2 may be mutually bilaterally symmetrical based on a boundary, and the driving circuit DRC of the second pixel PX2 and the driving circuit DRC of the third pixel PX3 may be mutually bilaterally symmetrical based on a boundary.

According to an embodiment, a size of the fifth transistor T5 shared by the first pixel PX1 and the second pixel PX2 may be equal to or greater than a size of the fifth transistor T5 of the third pixel PX3 that does not share the fifth transistor T5. For example, as shown in FIG. 11, a channel width W1 of the fifth transistor T5 shared by the first pixel PX1 and the second pixel PX2 may be equal to or greater than a channel width W2 of the fifth transistor T5 of the third pixel PX3.

According to an embodiment, the size of the fifth transistor T5 shared by the first pixel PX1 and the second pixel PX2 may be equal to or greater than sizes of remaining switching transistors (e.g., the second transistor T2, the third transistor T3, the fourth transistor T4, the sixth transistor T6, and the seventh transistor T7) of the first pixel PX1 and the second pixel PX2. For example, as shown in FIG. 11, the channel width W1 of the fifth transistor T5 shared by the first pixel PX1 and the second pixel PX2 may be equal to or greater than a channel width W3 of the seventh transistors T7 of the first pixel PX1 and second pixel PX2.

According to an embodiment, a vertical conductive line extending in the y direction may be disposed between one of two pixels sharing the fifth transistor T5, from among the first to third pixels PX1 to PX3 in a pixel portion, and a remaining pixel that does not share the fifth transistor T5. According to an embodiment, the vertical conductive line may be a common voltage line EOL electrically connected to the opposing electrode of the organic light-emitting diode OLED in at least one arbitrary area among the display area DA.

As shown in FIG. 12A, the common voltage line EOL may be disposed between the second circuit area PCA2 of the second pixel PX2 and the third circuit area PCA3 of the third pixel PX3. This is for the scenario where the third circuit area PCA3 does not share a fifth transistor T5, while the second circuit area PCA2 does share a fifth transistor T5 with the first pixel PX1.

According to an embodiment as shown in FIG. 12B, the vertical conductive line may further include a vertical driving voltage line PLv, a vertical first initialization voltage line VL1*v*, a vertical second initialization voltage line VL2*v*, and a vertical reference voltage line VRLv which may be electrically connected to horizontal conductive lines extending in the x direction.

The vertical driving voltage line PLv may be electrically connected to the driving voltage line PL extending in the x direction on each row. The vertical first initialization voltage line VL1*v* may be electrically connected to the first initialization voltage line VL1 extending in the x direction on each row. The vertical second initialization voltage line VL2*v* may be electrically connected to the second initialization voltage line VL2 extending in the x direction on each row. The vertical reference voltage line VRLv may be electrically connected to the reference voltage line VRL extending in the x direction on each row.

As shown in FIG. 12B, one of the vertical first initialization voltage line VL1*v*, the vertical second initialization voltage line VL2*v*, and the vertical reference voltage line VRLv may be disposed between the first circuit area PCA1 of the first pixel PX1 and the second circuit area PCA2 of the second pixel PX2, wherein the first pixel PX1 and the second pixel PX2 share a fifth transistor T5. Also, the common voltage line EOL may be disposed between the second circuit area PCA2 of the second pixel PX2 and the third circuit area PCA3 of the third pixel PX3. The vertical driving voltage line PLv may be disposed between the third circuit area PCA3 of the third pixel PX3 and the first circuit area PCA1 of the first pixel PX1.

The above-described embodiments may not be limited to the pixel PX shown in FIG. 7. For example, at least two pixels on a same row may share a node to which a drain of a driving transistor may be electrically connected and a transistor electrically connected to the node, as transistors configuring a pixel circuit may be N-type oxide transistors, include a source follower driving transistor, and may be applied to a pixel performing threshold voltage compensation of the driving transistor by using a voltage applied to a gate of the driving transistor during a period separate from a data signal write period.

FIGS. 13 to 18 are schematic diagrams of an equivalent circuit of the pixel PX according to an embodiment. FIGS. 13 to 18 are schematic diagrams showing the pixels PX to which an embodiment of the disclosure may be applicable. Regarding the pixels PX shown in FIGS. 13 to 18, transistors configuring a pixel circuit may include an N-type oxide transistor, i.e., a source follower driving transistor.

Figure 13:
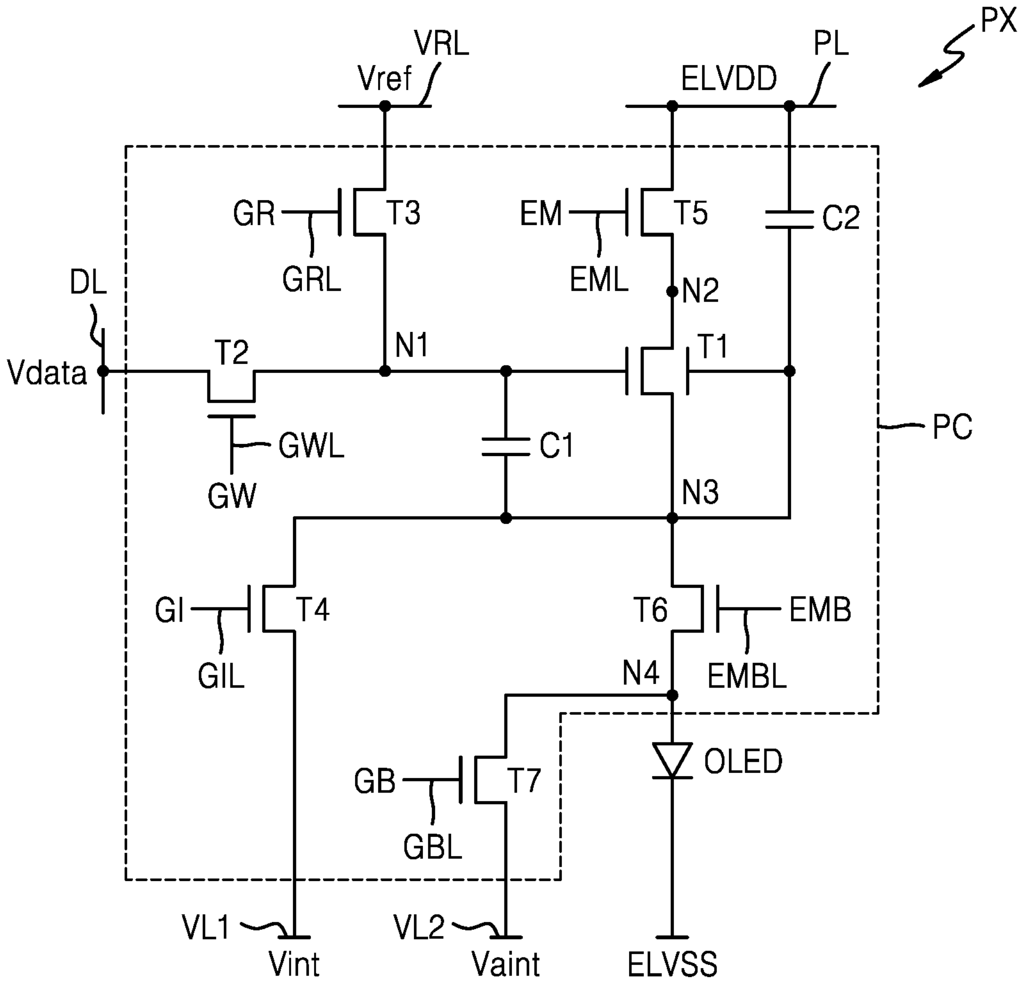
FIGS. 13 to 18 are schematic diagrams of an equivalent circuit of a pixel according to an embodiment.

The pixel PX shown in FIG. 13 differs from the pixel PX shown in FIG. 7 in that the gate of the seventh transistor T7 receives a sixth gate signal GB by being electrically connected to a sixth gate line GBL. In the display device 10 of FIG. 2, the sixth gate lines GBL may be further disposed in the pixel part 11 and the gate driving circuit 13 may further generate the sixth gate signal GB.

According to an embodiment, the second gate signal GI supplied to the gate of the fourth transistor T4 and the sixth gate signal GB supplied to the gate of the seventh transistor T7 may be simultaneously supplied during the first period P1 and the fourth period P4 of FIG. 8. According to an embodiment, the second gate signal GI may be supplied to the gate of the fourth transistor T4 during the first period P1 of FIG. 8, and the sixth gate signal GB may be supplied to the gate of the seventh transistor T7 during the fourth period P4 of FIG. 8.

Figure 14:
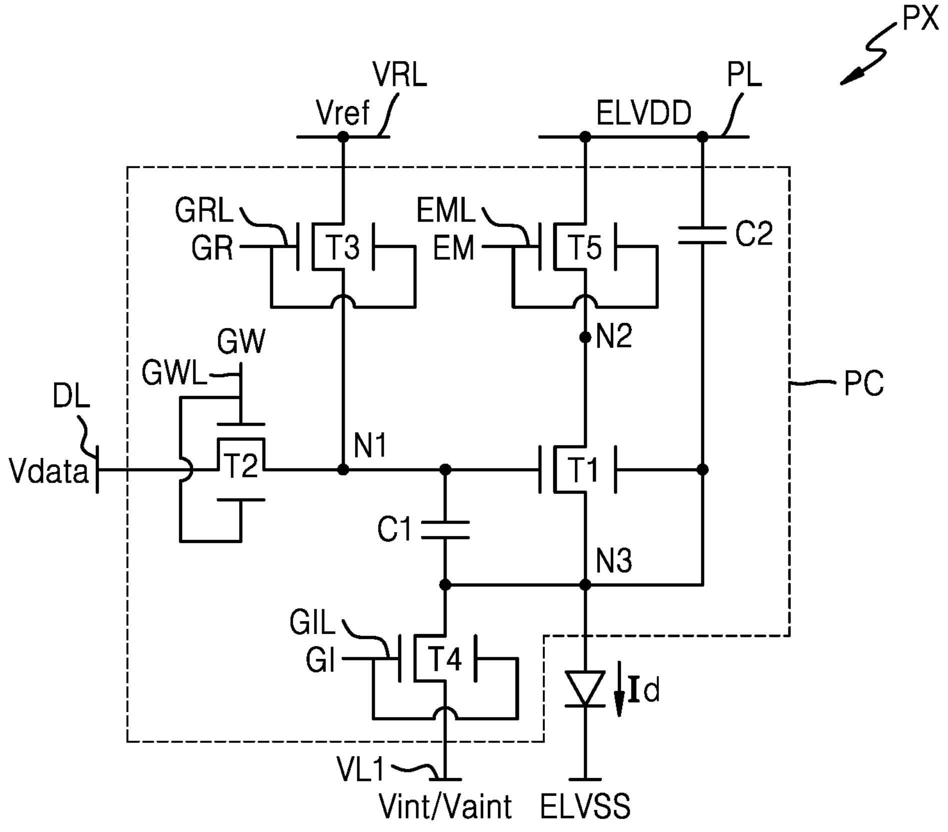

The pixel PX shown in FIG. 14 differs from the pixel PX shown in FIG. 7 in that the sixth transistor T6 and the seventh transistor T7 may be omitted and the second to fifth transistors T2 to T5 may be dual gate transistors including a first gate and a second gate.

The first gate and second gate of the second transistor T2 may be electrically connected to the first gate line GWL, the first gate and second gate of the third transistor T3 may be electrically connected to the third gate line GRL, the first gate and second gate of the fourth transistor T4 may be electrically connected to the second gate line GIL, and the first gate and second gate of the fifth transistor T5 may be electrically connected to the fourth gate line EML.

The first initialization voltage Vint or second initialization voltage Vaint may be supplied to the first initialization voltage line VL1 electrically connected to the fourth transistor T4. The second terminal of the first transistor T1 may be electrically connected (e.g., directly connected) to the pixel electrode of the organic light-emitting diode OLED.

Figure 15:
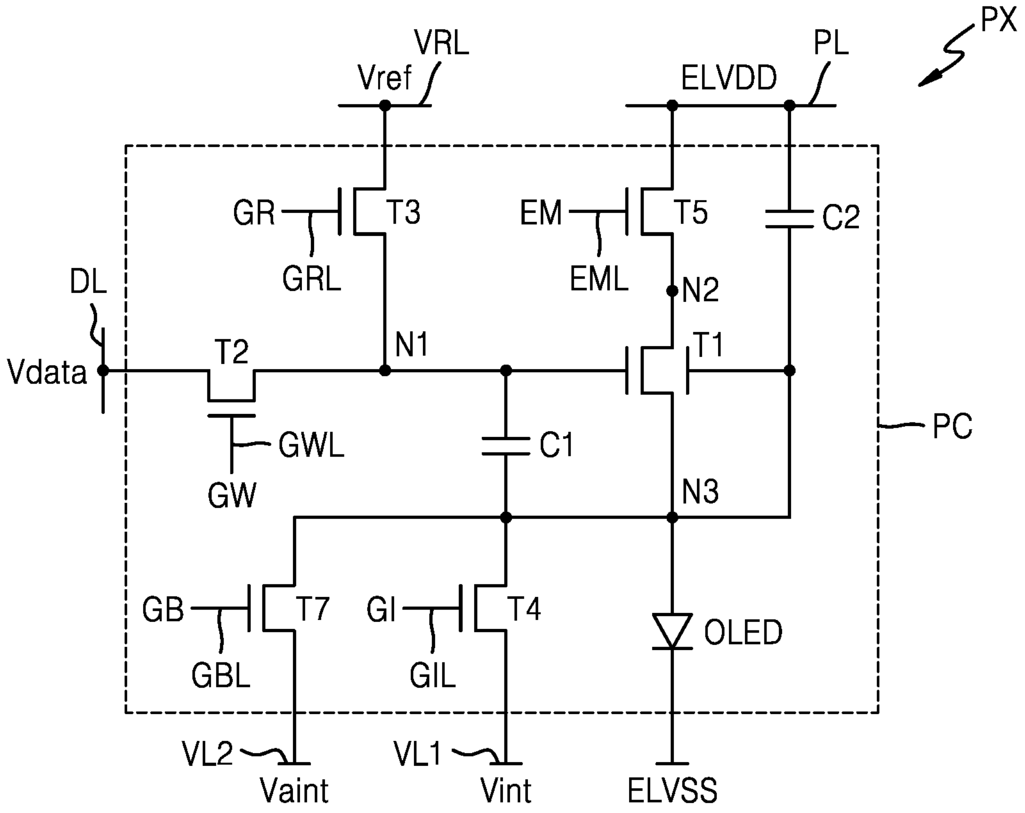

The pixel PX shown in FIG. 15 differs from the pixel PX shown in FIGS. 7 and 13 in that the sixth transistor T6 may be omitted, and the gate of the seventh transistor T7 may be electrically connected to the sixth gate line GBL to receive the sixth gate signal GB.

Figure 16:
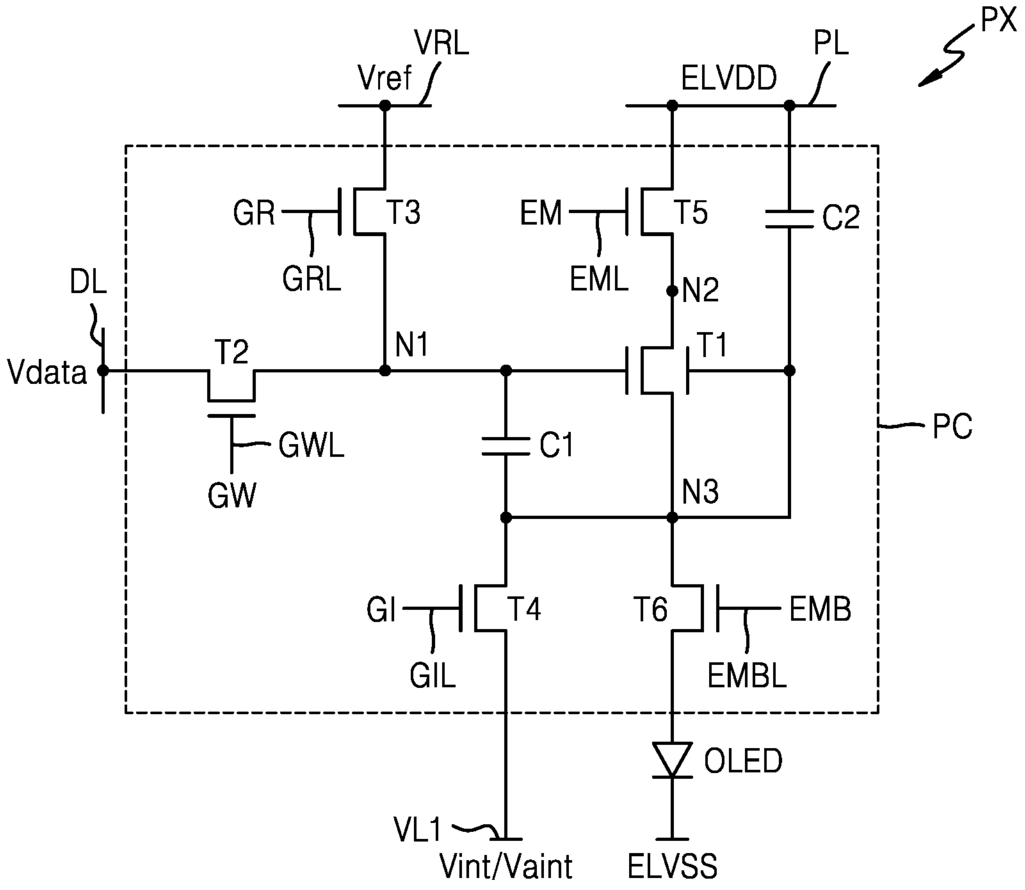

The pixel PX shown in FIG. 16 differs from the pixel PX shown in FIGS. 7 and 13 in that the seventh transistor T7 may be omitted. The first initialization voltage Vint or second initialization voltage Vaint may be supplied to the first initialization voltage line VL1 electrically connected to the fourth transistor T4.

Figure 17:
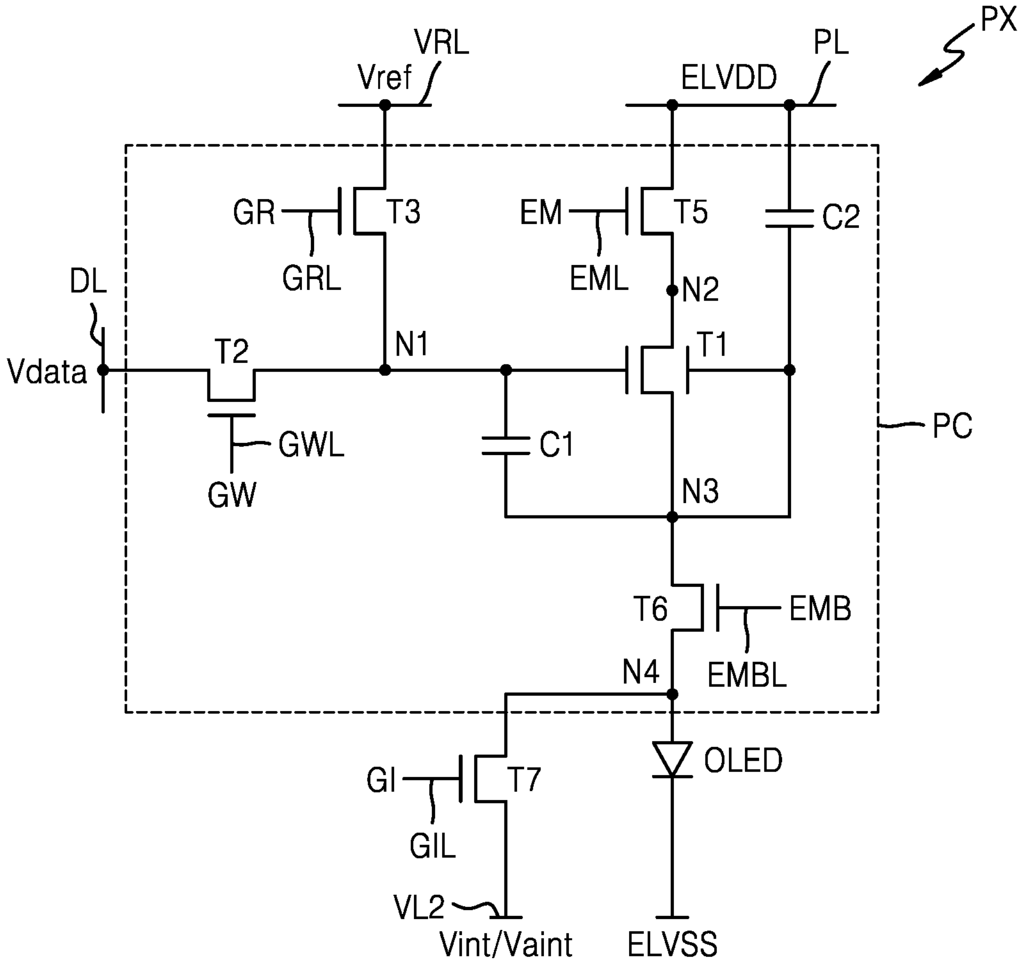

The pixel PX shown in FIG. 17 differs from the pixel PX shown in FIG. 7 in that the fourth transistor T4 may be omitted. The first initialization voltage Vint or second initialization voltage Vaint may be supplied to the second initialization voltage line VL2 electrically connected to the seventh transistor T7.

Figure 18:
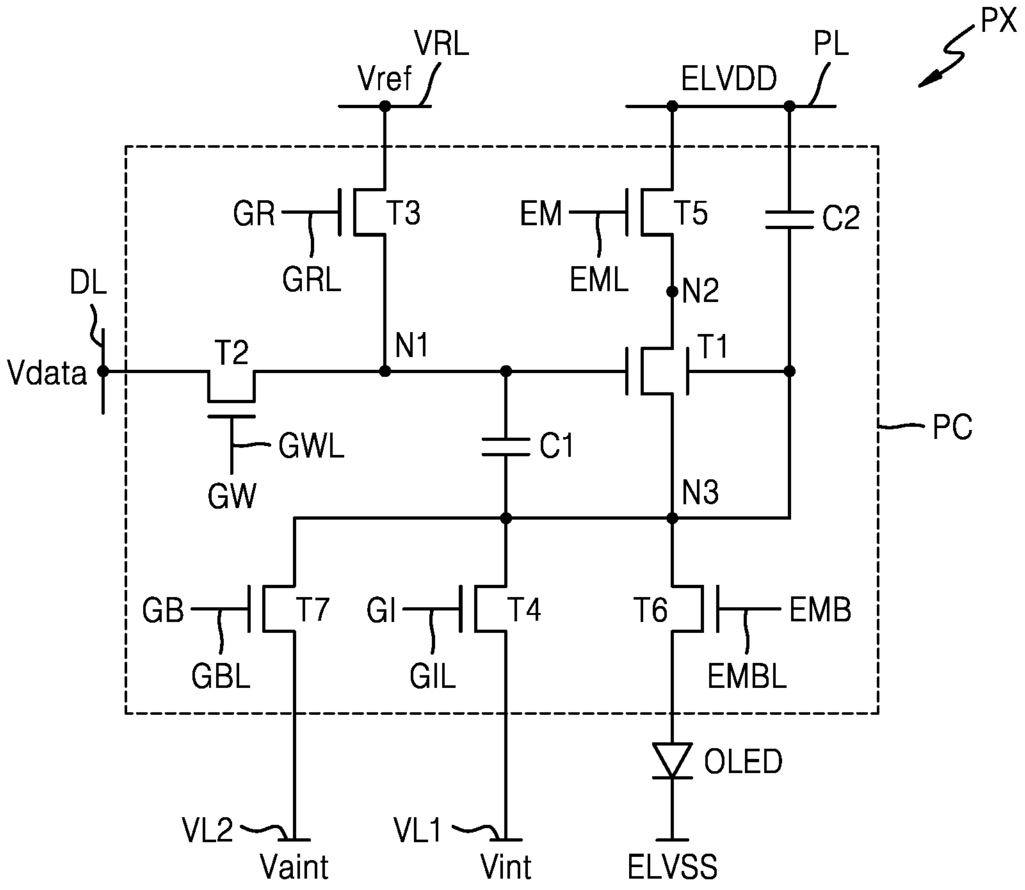

The pixel PX shown in FIG. 18 differs from the pixel PX shown in FIG. 7 in that the seventh transistor T7 may be electrically connected between the third node N3 and the second initialization voltage line VL2, and the gate of the seventh transistor T7 may be electrically connected to the sixth gate line GBL to receive the sixth gate signal GB.

The above-described embodiments may not be limited to the pixel arrangement structure shown in FIG. 6. For example, a pixel portion may be identically applied to a pixel arrangement structure including a first pixel portion including the first pixel PX1 and second pixel PX2, and a second pixel portion including the third pixel PX3 and second pixel PX2. The first pixel PX1 and second pixel PX2 may share an emission control transistor, and the third pixel PX3 and second pixel PX2 may share an emission control transistor.

Figure 19:
FIG. 19 is a schematic cross-sectional view of a structure of a display element according to an embodiment.

FIG. 19 is a schematic cross-sectional view of a structure of a display element according to an embodiment. FIGS. 20A to 22 are schematic cross-sectional views of a structure of a display element according to an embodiment. Referring to FIG. 19, the organic light-emitting diode OLED as the display element according to an embodiment may include the pixel electrode 211, an opposing electrode 215, and an intermediate layer 213 disposed between the pixel electrode 211 (first electrode or anode) and the opposing electrode 215 (second electrode or cathode).

The pixel electrode 211 may include a transparent conducting oxide, such as indium tin oxide (ITO), indium zinc oxide (IZO), zinc oxide (ZnO), indium oxide ($In_2O_3$), indium gallium oxide (IGO), aluminum zinc oxide (AZO), or a combination thereof. The pixel electrode 211 may include a reflective layer including silver (Ag), magnesium (Mg), aluminum (Al), platinum (Pt), palladium (Pd), gold (Au), nickel (Ni), neodymium (Nd), iridium (Ir), chromium (Cr), a compound thereof, or a combination thereof. For example, the pixel electrode 211 may have a three-layer structure of ITO/Ag/ITO.

The opposing electrode 215 may be disposed on the intermediate layer 213. The opposing electrode 215 may include a metal having a low work function, an alloy, an electric conductive compound, or an arbitrary combination thereof. For example, the opposing electrode 215 may include lithium (Li), Ag. Mg, Al, Al—Li, calcium (Ca), Mg—In, Mg—Ag, ytterbium (Yb), Ag—Yb, ITO, IZO, or an arbitrary combination thereof. The opposing electrode 215 may be a transparent electrode, a semi-transparent electrode, or a reflective electrode.

The intermediate layer 213 may include a high-molecular weight organic material or low-molecular weight organic material which emits light of a certain color. The intermediate layer 213 may further include, in addition to various organic materials, a metal-containing compound such as an organic metal compound and an inorganic material such as a quantum dot.

According to an embodiment, the intermediate layer 213 may include one emission layer, and a first functional layer and a second functional layer respectively below and on the emission layer. The first functional layer may include for example a hole transport layer (HTL) or may include an HTL and/or a hole injection layer (HIL). The second functional layer may include an electron transport layer (ETL) and/or an electron injection layer (EIL). The first functional layer or the second functional layer may instead be omitted. The first functional layer and second functional layer may be integral with each other to correspond to the organic light-emitting diodes OLED included in the display area DA.

According to an embodiment, the intermediate layer 213 may include two or more emitting parts (e.g., light emitting parts) sequentially stacked on each other between the pixel electrode 211 and the opposing electrode 215, and a charge generation layer CGL disposed between the two emitting parts. In case that the intermediate layer 213 includes the emitting part and the charge generation layer, the organic light-emitting diode OLED may be a tandem light-emitting element. The organic light-emitting diode OLED may have a stack structure of multiple emitting parts, and thus have improved color purity and light-emitting efficiency.

One emitting part may include the emission layer and the first functional layer and the second functional layer respectively below and on the emission layer. The charge generation layer may include a negative charge generation layer and a positive charge generation layer. The light-emitting efficiency of the organic light-emitting diode OLED that may be the tandem light-emitting element including the emission layers may be further increased by the negative charge generation layer nCGL and the positive charge generation layer pCGL.

The negative charge generation layer may be an n-type charge generation layer. The negative charge generation layer nCGL may supply electrons. The negative charge generation layer may include a host and a dopant. The host may include an organic material. The dopant may include a metallic material. The positive charge generation layer may be a p-type charge generation layer. The positive charge generation layer pCGL may supply holes. The positive charge generation layer may include a host and a dopant. The host may include an organic material. The dopant may include a metallic material.

Figure 20A:
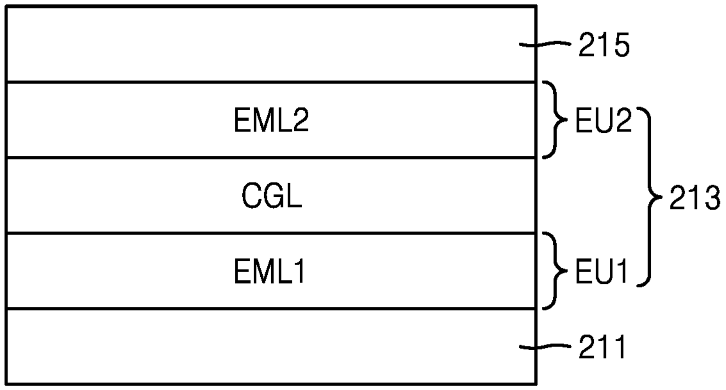
FIGS. 20A to 22 are schematic cross-sectional views of a structure of a display element according to an embodiment.

According to an embodiment, as shown in FIG. 20A, the organic light-emitting diode OLED may include a first emitting part EU1 including a first emission layer EML1 and a second emitting part EU2 including a second emission layer EML2 which may be sequentially stacked on each other. A charge generation layer CGL may be disposed between the first emitting part EU1 and the second emitting part EU2. For example, the organic light-emitting diode OLED may include the pixel electrode 211, the first emission layer EML1, the charge generation layer CGL, the second emission layer EML2, and the opposing electrode 215 which may be sequentially stacked on each other in the stated order. The first functional layer and the second functional layer may be disposed respectively below and on the first emission layer EML1. The first functional layer and the second functional layer may be disposed respectively below and on the second emission layer EML2. The first emission layer EML1 may be a blue emission layer and the second emission layer EML2 may be a yellow emission layer.

Figure 20B:
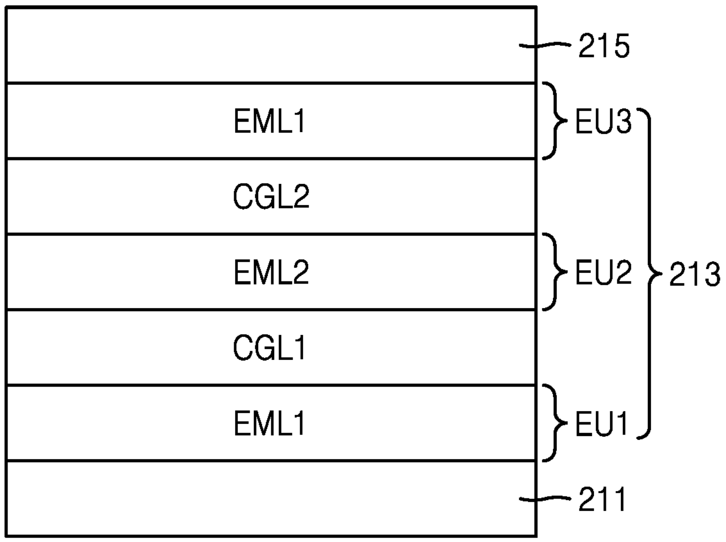

According to an embodiment, as shown in FIG. 20B, the organic light-emitting diode OLED may include the first emitting part EU1 and a third emitting part EU3 which include the first emission layer EML1, and the second emitting part EU2 including the second emission layer EML2. A first charge generation layer CGL1 may be disposed between the first emitting part EU1 and the second emitting part EU2, and a second charge generation layer CGL2 may be disposed between the second emitting part EU2 and the third emitting part EU3. For example, the organic light-emitting diode OLED may include the pixel electrode 211, the first emission layer EML1, the first charge generation layer CGL1, the second emission layer EML2, the second charge generation layer CGL2, the first emission layer EML1, and the opposing electrode 215 which may be stacked on each other in the stated order. The first functional layer and the second functional layer may be disposed respectively below and on the first emission layer EML1. The first functional layer and the second functional layer may be disposed respectively below and on the second emission layer EML2. The first emission layer EML1 may be a blue emission layer and the second emission layer EML2 may be a yellow emission layer.

According to an embodiment, in the organic light-emitting diode OLED, the second emitting part EU2 may further include, in addition to the second emission layer EML2, a third emission layer EML3 and/or a fourth emission layer EML4 which may be in direct contact with a bottom and/or a top of the second emission layer EML2. Here, the direct contact may indicate that another layer may not be disposed between the second emission layer EML2 and the third emission layer EML3 and/or between the second emission layer EML2 and the fourth emission layer EML4. The third emission layer EML3 may be a red emission layer and the fourth emission layer EML4 may be a green emission layer.

Figure 20C:
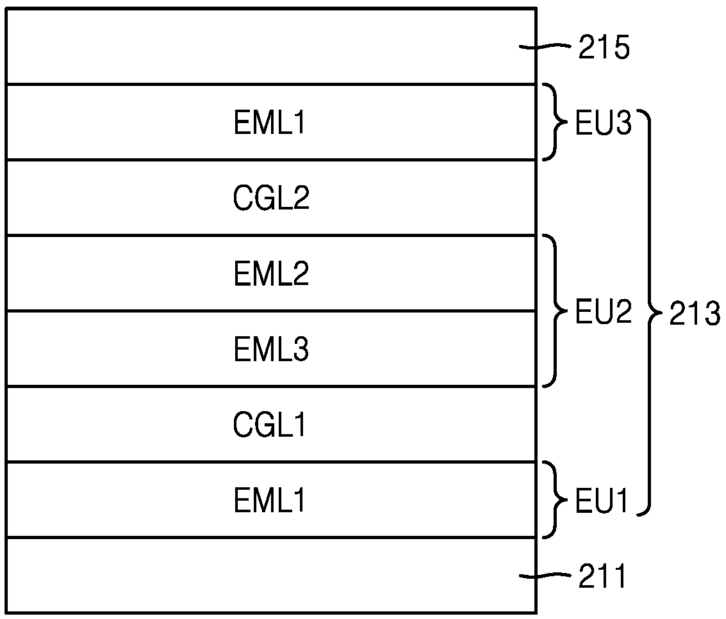
Figure 20D:
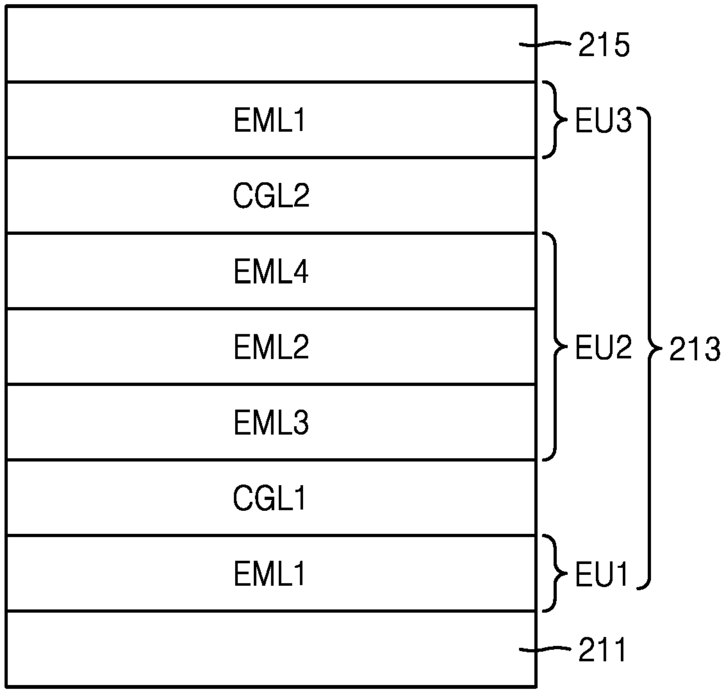

For example, as shown in FIG. 20C, the organic light-emitting diode OLED may include the pixel electrode 211, the first emission layer EML1, the first charge generation layer CGL1, the third emission layer EML3, the second emission layer EML2, the second charge generation layer CGL2, the first emission layer EML1, and the opposing electrode 215 which may be sequentially stacked on each other in the stated order. As shown in FIG. 20D, the organic light-emitting diode OLED may include the pixel electrode 211, the first emission layer EML1, the first charge generation layer CGL1, the third emission layer EML3, the second emission layer EML2, the fourth emission layer EML4, the second charge generation layer CGL2, the first emission layer EML1, and the opposing electrode 215 which may be sequentially stacked on each other in the stated order.

Figure 21A:
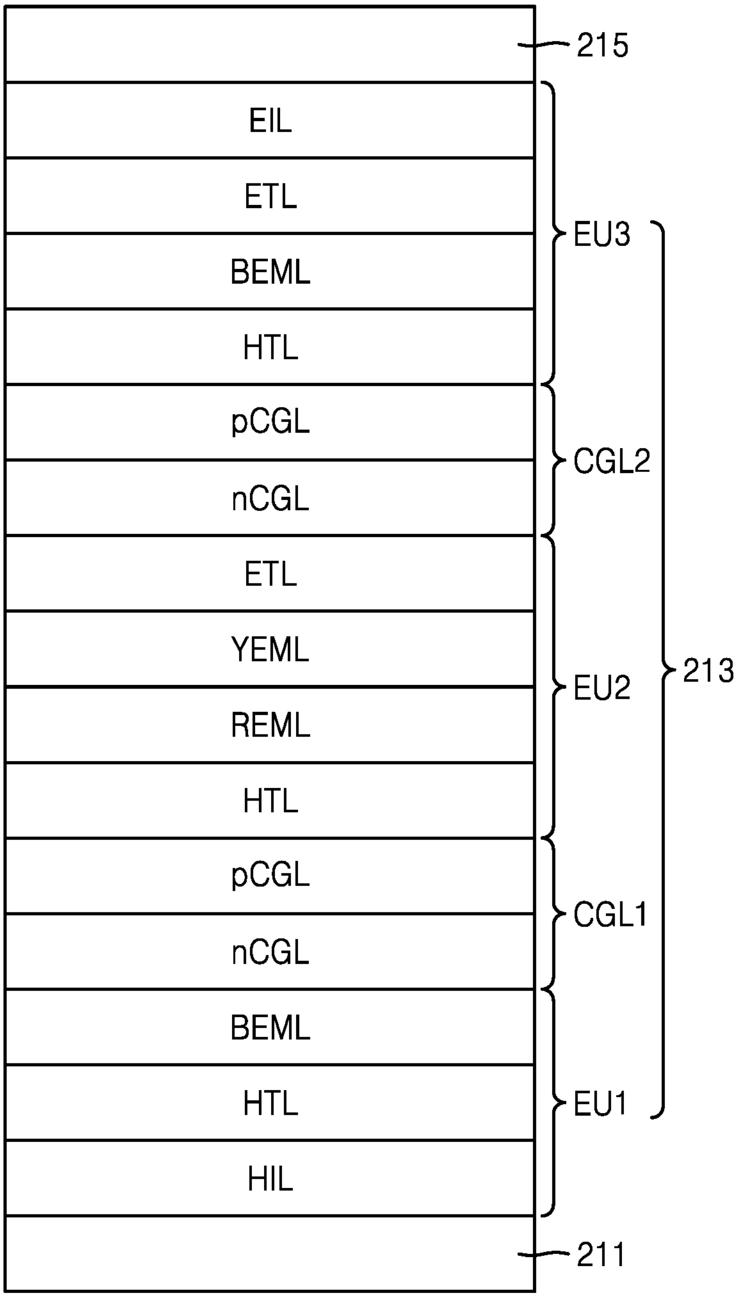
Figure 21B:
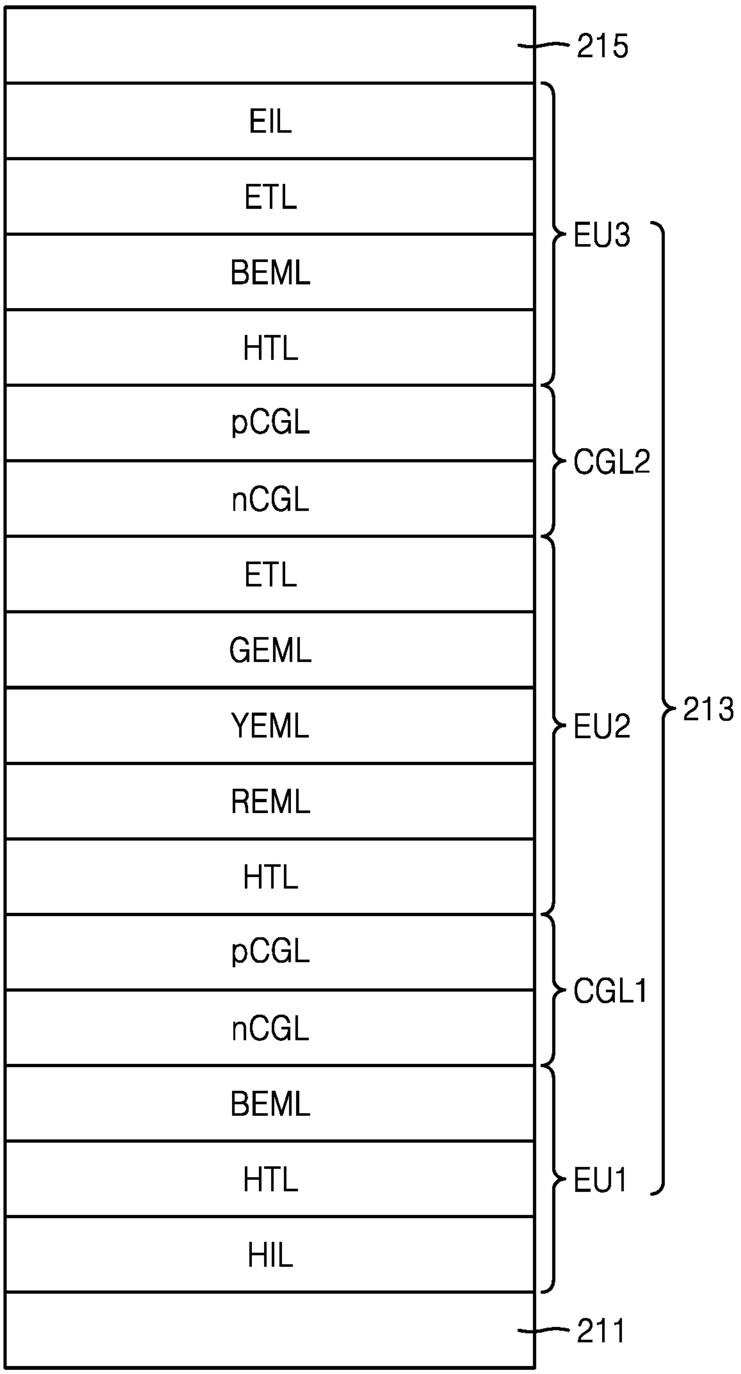

FIG. 21A is a schematic cross-sectional view showing an example of the organic light-emitting diode OLED of FIG. 20C, and FIG. 21B is a schematic cross-sectional view showing an example of the organic light-emitting diode OLED of FIG. 20D. Referring to FIG. 21A, the organic light-emitting diode OLED may include the first emitting part EU1, the second emitting part EU2, and the third emitting part EU3 which may be sequentially stacked on each other in the stated order. The first charge generation layer CGL1 may be disposed between the first emitting part EU1 and the second emitting part EU2, and the second charge generation layer CGL2 may be disposed between the second emitting part EU2 and the third emitting part EU3. The first charge generation layer CGL1 and the second charge generation layer CGL2 may each include a negative charge generation layer nCGL and a positive charge generation layer pCGL.

The first emitting part EU1 may include a blue emission layer BEML. The first emitting part EU1 may further include a hole injection layer HIL and a hole transport layer HTL between the pixel electrode 211 and the blue emission layer BEML. According to an embodiment, a p-doping layer may be further included between the hole injection layer HIL and the hole transport layer HTL. The p-doping layer may be formed by doping the hole injection layer HIL with a p-type doping material. According to an embodiment, at least one of a blue light auxiliary layer, an electron blocking layer, and a buffer layer may be further disposed between the blue emission layer BEML and the hole transport layer HTL. The blue light auxiliary layer may enhance light-emitting efficiency of the blue emission layer BEML. The blue light auxiliary layer may enhance the light-emitting efficiency of the blue emission layer BEML may adjusting a hole charge balance. The electron blocking layer may prevent electron injection to the hole transport layer HTL. The buffer layer may compensate for a resonance distance according to a wavelength of light emitted from an emission layer.

The second emitting part EU2 may include a yellow emission layer YEML and a red emission layer REML in direct contact with the yellow emission layer YEML below the yellow emission layer YEML. The second emitting part EU2 may further include the hole transport layer HTL between the positive charge generation layer pCGL of the first charge generation layer CGL1 and the red emission layer REML, and an electron transport layer ETL between the yellow emission layer YEML and the negative charge generation layer nCGL of the second charge generation layer CGL2.

The third emitting part EU3 may include the blue emission layer BEML. The third emitting part EU3 may further include the hole transport layer HTL between the positive charge generation layer pCGL of the second charge generation layer CGL2 and the blue emission layer BEML. The third emitting part EU3 may further include the electron transport layer ETL and an electron injection layer EIL between the blue emission layer BEML and the opposing electrode 215. The electron transport layer ETL may be a single layer or a multilayer. According to an embodiment, at least one of the blue light auxiliary layer, the electron blocking layer, and the buffer layer may be further disposed between the blue emission layer BEML and the hole transport layer HTL. At least one of a hole blocking layer and the buffer layer may be further disposed between the blue emission layer BEML and the electron transport layer ETL. The hole blocking layer may prevent hole injection to the electron transport layer ETL.

The organic light-emitting diode OLED shown in FIG. 21B has a same configuration as the organic light-emitting diode OLED shown in FIG. 21A, except for a stack structure of the second emitting part EU2. Referring to FIG. 21B, the second emitting part EU2 may include the yellow emission layer YEML, the red emission layer REML in direct contact with the yellow emission layer YEML below the yellow emission layer YEML, and a green emission layer GEML in direct contact with the yellow emission layer YEML on the yellow emission layer YEML. The second emitting part EU2 may further include the hole transport layer HTL between the positive charge generation layer pCGL of the first charge generation layer CGL1 and the red emission layer REML, and the electron transport layer ETL between the green emission layer GEML and the negative charge generation layer nCGL of the second charge generation layer CGL2.

Figure 22:
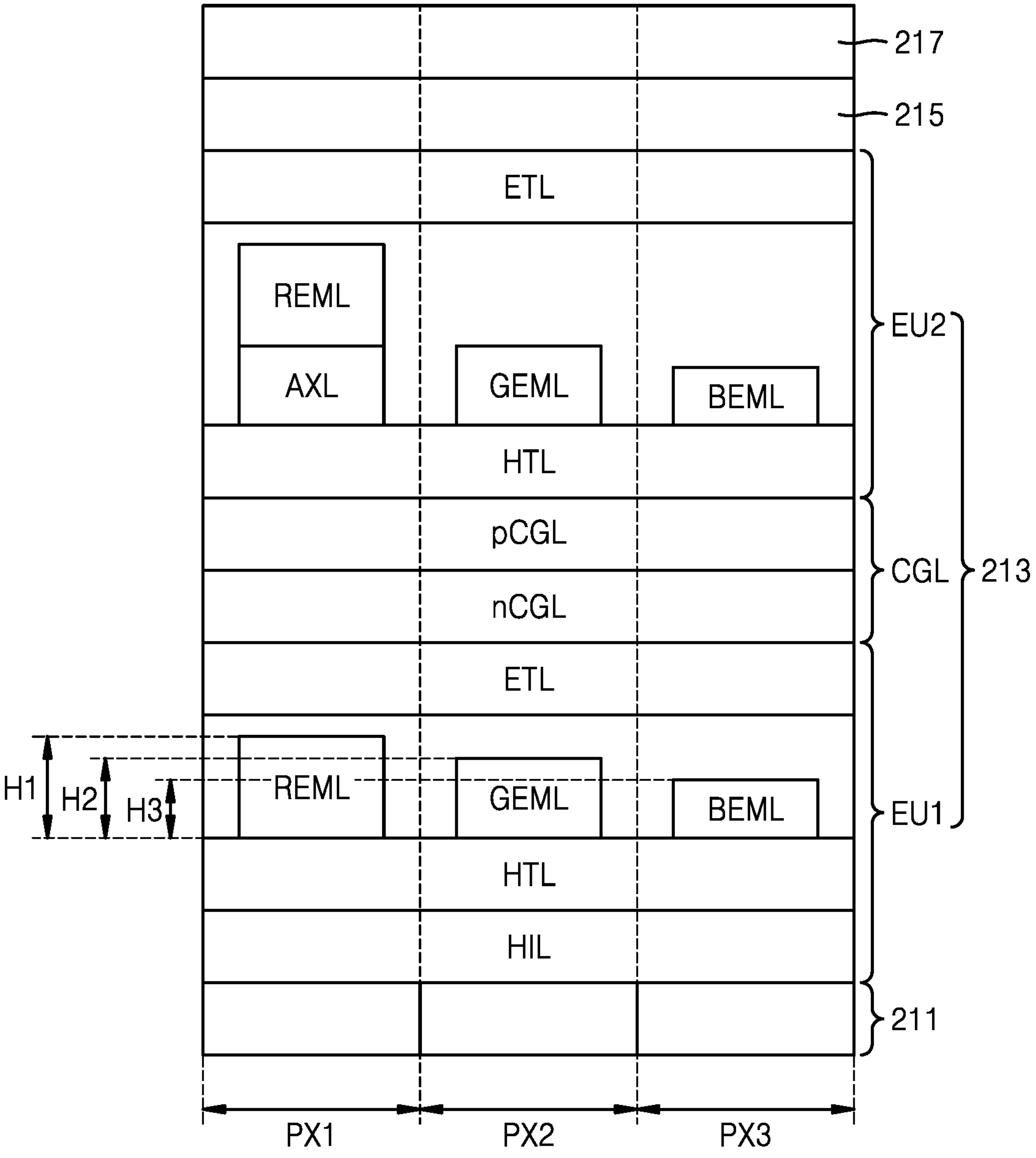

FIG. 22 is a schematic cross-sectional view of a structure of the pixel PX of the display device 10 according to an embodiment. Referring to FIG. 22, the display device 10 may include the pixels PX. The pixels PX may include the first pixel PX1, the second pixel PX2, and the third pixel PX3. The first pixel PX1, the second pixel PX2, and the third pixel PX3 may each include the pixel electrode 211, the opposing electrode 215, and the intermediate layer 213. According to an embodiment, the first pixel PX1 may be a red pixel, the second pixel PX2 may be a green pixel, and the third pixel PX3 may be a blue pixel. Here, the pixel PX may include the organic light-emitting diode OLED as a display element, and the organic light-emitting diode OLED of each pixel PX may be electrically connected to a pixel circuit.

The pixel electrode 211 may be disposed independently to each of the first pixel PX1, the second pixel PX2, and the third pixel PX3. The intermediate layer 213 of the organic light-emitting diode OLED of each of the first pixel PX1, the second pixel PX2, and the third pixel PX3 may include the first emitting part EU1 and the second emitting part EU2 which may be sequentially stacked on each other, and the charge generation layer CGL between the first emitting part EU1 and the second emitting part EU2. The charge generation layer CGL may include the negative charge generation layer nCGL and the positive charge generation layer pCGL. The charge generation layer CGL may be a common layer formed consecutively on the first pixel PX1, the second pixel PX2, and the third pixel PX3.

The first emitting part EU1 of the first pixel PX1 may include the hole injection layer HIL, the hole transport layer HTL, the red emission layer REML, and the electron transport layer ETL which may be sequentially stacked on each other in the stated order on the pixel electrode 211. The first emitting part EU1 of the second pixel PX2 may include the hole injection layer HIL, the hole transport layer HTL, the green emission layer GEML, and the electron transport layer ETL which may be sequentially stacked on each other in the stated order on the pixel electrode 211. The first emitting part EU1 of the third pixel PX3 may include the hole injection layer HIL, the hole transport layer HTL, the blue emission layer BEML, and the electron transport layer ETL which may be sequentially stacked on each other in the stated order on the pixel electrode 211. Each of the hole injection layers HIL, the hole transport layers HTL, and the electron transport layers ETL of the first emitting parts EU1 may be a common layer consecutively formed on the first pixel PX1, the second pixel PX2, and the third pixel PX3.

The second emitting part EU2 of the first pixel PX1 may include the hole transport layer HTL, an auxiliary layer AXL, the red emission layer REML, and the electron transport layer ETL which may be sequentially stacked on each other in the stated order on the charge generation layer CGL. The second emitting part EU2 of the second pixel PX2 may include the hole transport layer HTL, the green emission layer GEML, and the electron transport layer ETL which may be sequentially stacked on each other in the stated order on the charge generation layer CGL. The second emitting part EU2 of the third pixel PX3 may include the hole transport layer HTL, the blue emission layer BEML, and the electron transport layer ETL which may be sequentially stacked on each other in the stated order, on the charge generation layer CGL. Each of the hole transport layers HTL and the electron transport layers ETL of the second emitting parts EU2 may be a common layer consecutively formed on the first pixel PX1, the second pixel PX2, and the third pixel PX3. According to an embodiment, at least one of the hole blocking layer and the buffer layer may be further disposed between an emission layer and the electron transport layer ETL in the second emitting parts EU2 of the first pixel PX1, the second pixel PX2, and the third pixel PX3.

A thickness H1 of the red emission layer REML, a thickness H2 of the green emission layer GEML, and a thickness H3 of the blue emission layer BEML may be determined according to a resonance distance. The auxiliary layer AXL may be a layer added to adjust the resonance distance, and may include a resonance auxiliary material. For example, the auxiliary layer AXL may include a same material as the hole transport layer HTL.

In FIG. 22, the auxiliary layer AXL may be disposed only in the first pixel PX1, but an embodiment of the disclosure may not be limited thereto. For example, the auxiliary layer AXL may be disposed in at least one of the first pixel PX1, the second pixel PX2, and the third pixel PX3, so as to adjust the resonance distance of each of the first pixel PX1, the second pixel PX2, and the third pixel PX3.

The display device 10 may further include a capping layer 217 disposed outside the opposing electrode 215. The capping layer 217 may enhance light-emitting efficiency according to the principle of constructive interference. Accordingly, light-extracting efficiency of the organic light-emitting diode OLED may be increased, and thus light-emitting efficiency of the organic light-emitting diode OLED may be enhanced.

According to embodiments of the disclosure, a display device in which display quality may be improved may be provided. Obviously, the scope of the disclosure may not be limited by such effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display device comprising a plurality of pixels, wherein each of the plurality of pixels comprises:

- a driving transistor including a gate, a first terminal and a second terminal;
- a driving control circuit including a first transistor, a first terminal of the first transistor being connected to the gate of the driving transistor and a second terminal of the first transistor being connected to a data line; and
- a light-emitting diode connected to the second terminal of the driving transistor, wherein
- the plurality of pixels comprises a first pixel and a second pixel in a same row,
- the first pixel and the second pixel share a first emission control transistor, the first emission control transistor is connected between a first voltage line and a common node, wherein the common node is connected to the first terminal of the driving transistor of the first pixel and to the first terminal of the driving transistor of the second pixel, and wherein the driving control circuit further includes a second transistor, which is different from the first transistor, including a first terminal connected to the gate of the driving transistor and a second terminal connected to a second voltage line.

2. The display device of claim 1, wherein the plurality of pixels further includes a third pixel, the third pixel being in a same row as the second pixel, the first terminal of the driving transistor of the third pixel is connected to the common node so that the third pixel shares the first emission control transistor with the second pixel.

3. The display device of claim 1, wherein the driving control circuit further comprises a switching transistor, and a channel width of the first emission control transistor is equal to or greater than a channel width of the switching transistor.

4. The display device of claim 1, wherein the plurality of pixels further includes a third pixel, the third pixel and the second pixel being disposed in a same row, and the third pixel includes a second emission control transistor connected between the first voltage line and the first terminal of the driving transistor of the third pixel.

5. The display device of claim 4, wherein a channel width of the first emission control transistor is equal to or greater than a channel width of the second emission control transistor.

6. The display device of claim 1, wherein the driving transistor of the first pixel and the driving transistor of the second pixel are symmetrical with respect to a boundary disposed between the first pixel and the second pixel.

7. The display device of claim 1, wherein the gate of the driving transistor of each of the plurality of pixels comprises a first gate and a second gate, the second gate being connected to the second terminal of the driving transistor, and the driving control circuit of each of the plurality of pixels further comprises:

a first capacitor connected to the first gate of the driving transistor and to the second terminal of the driving transistor; and a second capacitor connected to the first voltage line and to the second terminal of the driving transistor.

8. The display device of claim 7, wherein the driving control circuit further comprises a third transistor connected to the second terminal of the driving transistor and to the light-emitting diode.

9. The display device of claim 8, wherein the driving control circuit further comprises a fourth transistor connected to the second terminal of the driving transistor and to a third voltage line.

10. The display device of claim 8, wherein the driving control circuit further comprises a fifth transistor connected to the light-emitting diode and to a fourth voltage line.

11. A display device comprising:

a first driving transistor in a first circuit area, the first driving transistor including a gate, a first terminal, and a second terminal;

a first light-emitting diode connected to the second terminal of the first driving transistor;

a second driving transistor in a second circuit area, the second driving transistor including a first terminal and a second terminal;

a second light-emitting diode connected to the second terminal of the second driving transistor;

a shared transistor connected to a driving voltage line and to a common node, the common node being connected to the first terminal of the first driving transistor and to the first terminal of the second driving transistor, and a switching transistor disposed in the first circuit area and including a gate, a first terminal, and a second terminal, the first terminal of the switching transistor being connected to the first light-emitting diode and the second terminal of the switching transistor being connected to an initialization voltage line, wherein a channel width of the shared transistor is greater than a channel width of the switching transistor.

12. The display device of claim 11, wherein the shared transistor is disposed in a partial area from among the first circuit area and the second circuit area.

13. The display device of claim 11, further comprising:

a third driving transistor in a third circuit area, the third driving transistor including a first terminal and a second terminal; and a third light-emitting diode connected to the second terminal of the third driving transistor, wherein the first terminal of the third driving transistor is connected to the common node.

14. The display device of claim 11, wherein the first driving transistor and the second driving transistor are symmetrical with respect to a boundary disposed between the first circuit area and the second circuit area.

15. The display device of claim 11, further comprising:

a third driving transistor in a third circuit area, the third driving transistor including a first terminal and a second terminal;

an emission control transistor disposed in the third circuit area and connected to the first terminal of the third driving transistor and to the driving voltage line; and a third light-emitting diode connected to the second terminal of the third driving transistor.

16. The display device of claim 15, wherein a channel width of the shared transistor is equal to or greater than a channel width of the emission control transistor.

17. The display device of claim 15, wherein the second driving transistor and the third driving transistor are symmetrical with respect to a boundary between the second circuit area and the third circuit area.

18. The display device of claim 15, further comprising:

a common voltage line disposed between the second circuit area and the third circuit area, wherein each of the first light-emitting diode to the third light-emitting diode comprises a pixel electrode and an opposing electrode, the common voltage line is connected to the opposing electrode, the third circuit area being spaced apart from the second circuit area in a first direction, and the common voltage line extending in a second direction intersecting the first direction.

19. The display device of claim 11, further comprising:

a first switching transistor disposed in the first circuit area, the first switching transistor being connected to a data line and to the gate of the first driving transistor; and a second switching transistor disposed in the first circuit area, the second switching transistor being connected to a reference voltage line and to the gate of the first driving transistor.

20. An electronic device comprising:

a display panel comprising a plurality of pixels in a display area;

a gate driving circuit for outputting gate signals to the plurality of pixels in response to a control signal; and a controller for generating the control signal based on an external signal and transmitting the control signal to the gate driving circuit, wherein each of the plurality of pixels comprises:

a driving transistor including a gate, a first terminal and a second terminal;

a driving control circuit including a first transistor, a first terminal of the first transistor being connected to the gate of the driving transistor and a second terminal of the first transistor being connected to a data line; and a light-emitting diode connected to the second terminal of the driving transistor, the plurality of pixels comprises a first pixel and a second pixel in a same row, the first pixel and the second pixel share an emission control transistor, the emission control transistor is connected between a first voltage line and a common node, and the common node is connected to the first terminal of the driving transistor of the first pixel and to the first terminal of the driving transistor of the second pixel, and wherein the driving control circuit further includes a second transistor, which is different from the first transistor, including a first terminal connected to the gate of the driving transistor and a second terminal connected to a second voltage line.

* * * * *